US009760635B2

(12) United States Patent
Bliss et al.

(10) Patent No.: US 9,760,635 B2
(45) Date of Patent: Sep. 12, 2017

(54) DYNAMIC SEARCH ENGINE FOR AN INDUSTRIAL ENVIRONMENT

(71) Applicant: Rockwell Automation Technologies, Inc., Mayfield Heights, OH (US)

(72) Inventors: Ronald E. Bliss, Twinsburg, OH (US); Douglas J. Reichard, Fairview Park, OH (US); Scott N. Sandler, Chagrin Falls, OH (US); Michael J. Pantaleano, Willoughby, OH (US); Ryan Cahalane, Chagrin Falls, OH (US); Jonathan D. Walter, Broadview Heights, OH (US); Jessica L. Korpela, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 278 days.

(21) Appl. No.: 14/536,490

(22) Filed: Nov. 7, 2014

(65) Prior Publication Data
US 2016/0132595 A1  May 12, 2016

(51) Int. Cl.
G06F 17/30 (2006.01)
G06F 3/06 (2006.01)
H04L 29/08 (2006.01)

(52) U.S. Cl.
CPC ......... *G06F 17/30864* (2013.01); *G06F 3/06* (2013.01); *G06F 17/30321* (2013.01); *H04L 67/10* (2013.01)

(58) Field of Classification Search
CPC ...... G05B 2219/36133; G05B 23/0272; G05B 2219/31334; G05B 2219/32351;
(Continued)

(56) References Cited

U.S. PATENT DOCUMENTS 6,618,856 B2 * 9/2003 Coburn ............ G05B 19/41885
700/86
7,117,043 B1 * 10/2006 Frederick ............ G05B 19/056
700/21

(Continued)

OTHER PUBLICATIONS

European Office Action for European Application Serial No. 15193628.3, dated May 17, 2016, 2 pages.

(Continued)

*Primary Examiner* — Dennis Truong
(74) *Attorney, Agent, or Firm* — Amin, Turocy & Watson, LLP

(57) ABSTRACT

A multi-platform industrial search system facilitates indexing and searching of plant-wide data residing on multiple different data platforms. The industrial search system automatically inventories industrial devices and other data sources located throughout a plant, and identifies available data items on each data source. The search system indexes the discovered data items in a federated data model that can subsequently be searched to locate data items or tags of interest. The federated data model records references to data items found on different types of data sources, including but not limited to industrial controller programs, human-machine interface applications, data historians, device documentation stores, inventory tracking systems, and other such data sources. The search system can also initiate automated searches of the federated data model in response to detected performance issues and deliver notifications and contextual information to plant personnel.

20 Claims, 23 Drawing Sheets

(58) Field of Classification Search
CPC ............ G06F 11/3409; G06F 11/3495; G06F 17/30321; G06F 17/30557; G06F 17/30554; H04L 41/069; H04L 67/025; H04L 67/22; Y10S 707/953; Y10S 707/964
USPC ............ 707/793, 802, 706, 741; 700/20, 83
See application file for complete search history.

(56) References Cited

U.S. PATENT DOCUMENTS

| | | | | |
|---|---|---|---|---|
| 8,438,192 | B2* | 5/2013 | Obitko | G05B 21/02 707/791 |
| 2007/0078824 | A1* | 4/2007 | Dorgelo | G06F 17/30321 |
| 2008/0016146 | A1 | 1/2008 | Gan et al. | |
| 2008/0082577 | A1* | 4/2008 | Hood | G06F 8/24 |
| 2008/0208368 | A1* | 8/2008 | Grgic | G05B 19/042 700/20 |
| 2008/0307523 | A1* | 12/2008 | Subramanyam | G06F 17/30731 726/21 |
| 2009/0077055 | A1* | 3/2009 | Dillon | G06F 17/30702 |
| 2009/0083649 | A1 | 3/2009 | Baier et al. | |
| 2009/0086021 | A1* | 4/2009 | Baier | H04N 7/18 348/143 |
| 2011/0022198 | A1 | 1/2011 | Plache et al. | |
| 2012/0194502 | A1* | 8/2012 | Smith | G06F 8/38 345/418 |
| 2012/0240049 | A1* | 9/2012 | Britt | G06F 9/4443 715/744 |
| 2012/0242648 | A1* | 9/2012 | Baier | G05B 19/409 345/418 |
| 2013/0006395 | A1* | 1/2013 | Plache | G05B 19/0426 700/83 |
| 2013/0123965 | A1* | 5/2013 | Cooper | G05B 19/042 700/97 |
| 2013/0124186 | A1* | 5/2013 | Donabedian | G06F 17/289 704/2 |
| 2013/0124465 | A1* | 5/2013 | Pingel | G06F 3/0604 707/610 |
| 2013/0212160 | A1* | 8/2013 | Lawson | G05B 19/4185 709/203 |
| 2014/0316540 | A1* | 10/2014 | Loncar | G05B 19/056 700/79 |
| 2016/0132538 | A1* | 5/2016 | Bliss | G05B 19/41855 707/741 |
| 2016/0292895 | A1* | 10/2016 | Billi | G06T 11/60 |

OTHER PUBLICATIONS

European Office Action for European Application Serial No. 15193678.8, dated May 17, 2016, 2 pages.
Marshall, et al. "In Search of More Meaningful Search", Serials Review, Sep. 2006, JAI, Amsterdam, NL—ISSN 0098-7913, vol. 32, Nr:3, pp. 172-180.
Extended European Search Report for European Application No. 15193628.3, dated Mar. 24, 2016, 9 pages.
Extended European Search Report for European Application No. 15193678.8, dated Mar. 24, 2016, 10 pages.
Office Action dated Nov. 30, 2016 for U.S. Appl. No. 14/536,504, 33 pages.

* cited by examiner

DYNAMIC SEARCH ENGINE FOR AN INDUSTRIAL ENVIRONMENT

BACKGROUND

The subject matter disclosed herein relates generally to industrial automation systems, and, more particularly, to a dynamic search engine capable of indexing and searching plant-wide industrial data across a range of different data source platforms.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for searching industrial data stored on multiple data sources across an industrial environment is provided, comprising an indexing component configured to discover available data items distributed across multiple data sources of an industrial enterprise and to generate a federated data model that records respective locations of the data items, wherein the multiple data sources comprise at least a first data source corresponding to a first data platform and a second data source corresponding to a second data platform; a search component configured to perform a search of the federated data model for a specified data item and to generate a set of search results identifying locations of the data item, wherein the set of search results comprises at least a first subset of results corresponding to the first data platform and a second subset of results corresponding to the second data platform; and a device interface component configured to send the set of search results to a client device.

Also, one or more embodiments provide a method for indexing and searching multi-platform industrial data, comprising identifying, by a system comprising a processor, available data items located on multiple data sources of an industrial environment, wherein the multiple data sources comprise at least a first data source corresponding to a first data platform and a second data source corresponding to a second data platform; generating, by the system, a federated data model that indexes respective locations of the data items; receiving, by the system, query information specifying a data item; in response to the receiving, identifying, by the system, locations of the data item based on a search of the federated data model; and sending, by the system, a set of search results to a client device, wherein the search results identify the locations of the data item.

Also, according to one or more embodiments, a non-transitory computer-readable medium is provided having stored thereon instructions that, in response to execution, cause a system to perform operations, the operations, comprising discovering available data items located on multiple data sources of an industrial environment, wherein the multiple data sources comprise at least a first data source corresponding to a first data platform and a second data source corresponding to a second data platform; creating a federated data model that records respective locations of the data items; in response to receiving query information specifying a data item, identifying locations of the data item based on a search of the federated data model; and sending a set of search results to a client device, wherein the search results identify the locations of the data item.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
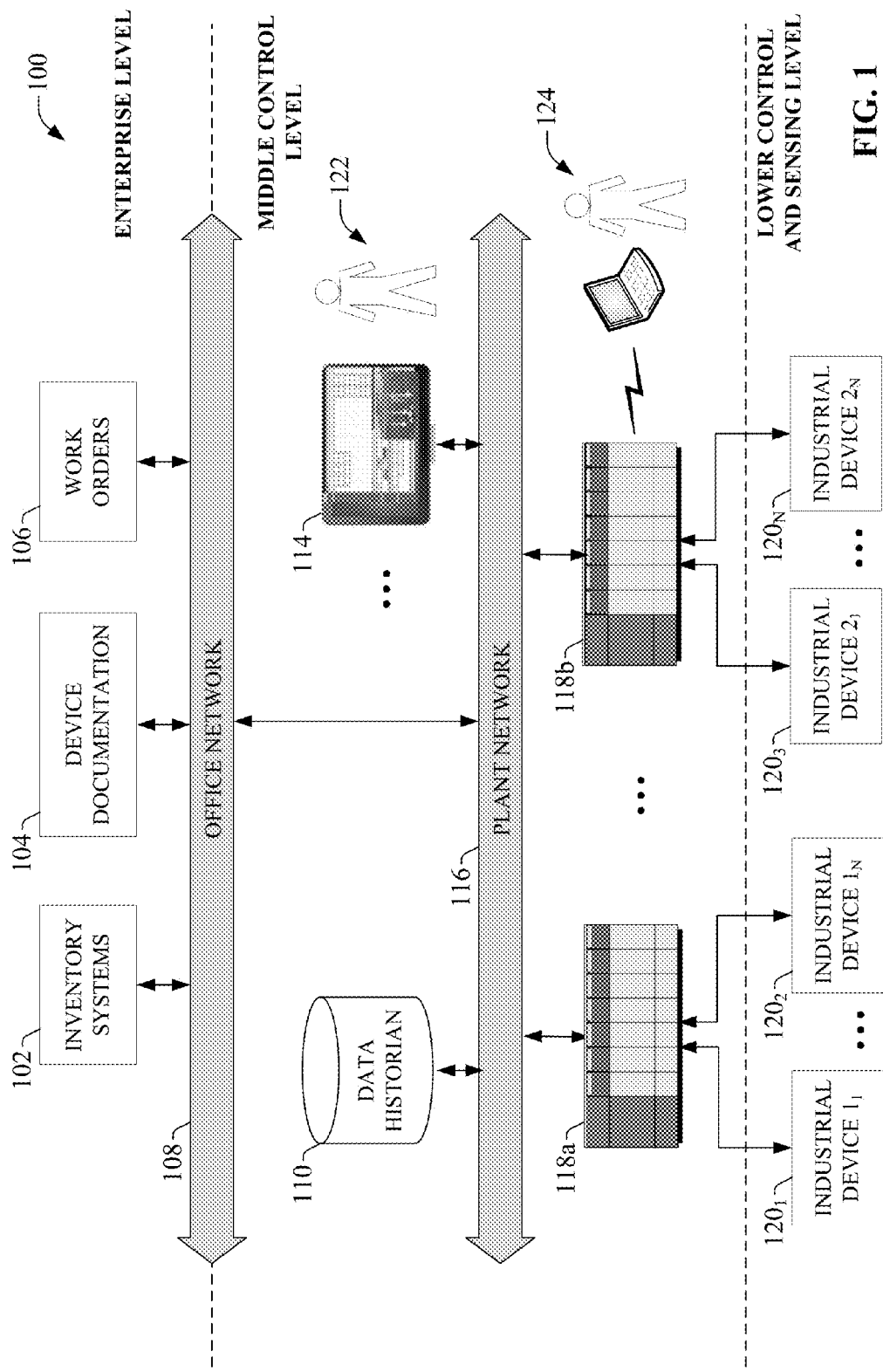
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modem automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Industrial controllers 118 and HMIs 114 comprise two sources of information relating to the industrial processes and systems being controlled within the plant environment. Since HMIs 114 leverage data from industrial controllers 118 to facilitate visualization of the controlled systems, both the industrial controllers 118 and the HMIs 114 may contain information relating a common aspect of the industrial systems. For example, the control programming (e.g., ladder logic, sequential function chart, etc.) for controlling operation of a particular tank used in a batch process may execute on one of the industrial controllers 118, while the operator interface screens for viewing a graphical representation of the tank's current status and relevant setpoints (e.g., level setpoint, maximum flow setpoints, etc.) may be viewed on one of the HMIs 114. However, since these two sources of information are segregated cross two different data sources and platforms, operators and maintenance personnel are typically only able to view one source of information at a time. That is, operators may choose to view the operator interface screens for the tank of interest on the relevant HMI terminal (see operator 122), or may connect a personal computing device (e.g., a laptop computer) to the industrial controller to view the control programming used to control the tank's operation (see operator 124). In most cases, the operator must be in physical proximity to either the HMI terminal or the industrial controller in order to view the information on that particular data source. Consequently, during troubleshooting of maintenance issues involving the tank, personnel must travel to the source of the information (e.g., the HMI terminal or industrial controller, which are often located near the physical machine being controlled) and locally search each of the HMI and the industrial controller individually.

Some industrial environments may also include other sources of potentially relevant information relating to specific aspects of the controlled industrial systems. These may include, for example, a data historian 110 that aggregates and stores production information collected from the industrial controllers 118 or other data sources, or a device documentation store 104 containing electronic documentation for the various industrial devices making up the controlled industrial systems. Other information sources may include an inventory tracking system 102, a work order management system 106, repositories for machine or process drawings and documentation, vendor product documentation storage, vendor knowledgebases, internal knowledgebases, or other such systems, some or all of which may reside on an office network 108 of the industrial environment. These diverse information sources are spread across many locations and systems both within the plant environment and externally (e.g., on the Internet). When diagnosing problems, maintenance personnel are often required to search several of these sources of information individually, using several different software packages specific to the respective data sources being searched. Moreover, searching for information pertaining to a particular device or machine often requires an extensive knowledge of the overall industrial system in order to locate the data source (e.g., industrial controllers, HMIs, etc.), to be searched, as well as to identify the relevant operator screens and control program routines.

Individually searching each of these data sources in connection with solving a system downtime issue or other problem can delay correction of maintenance issues, resulting in lost revenue and scheduling problems.

Figure 2:
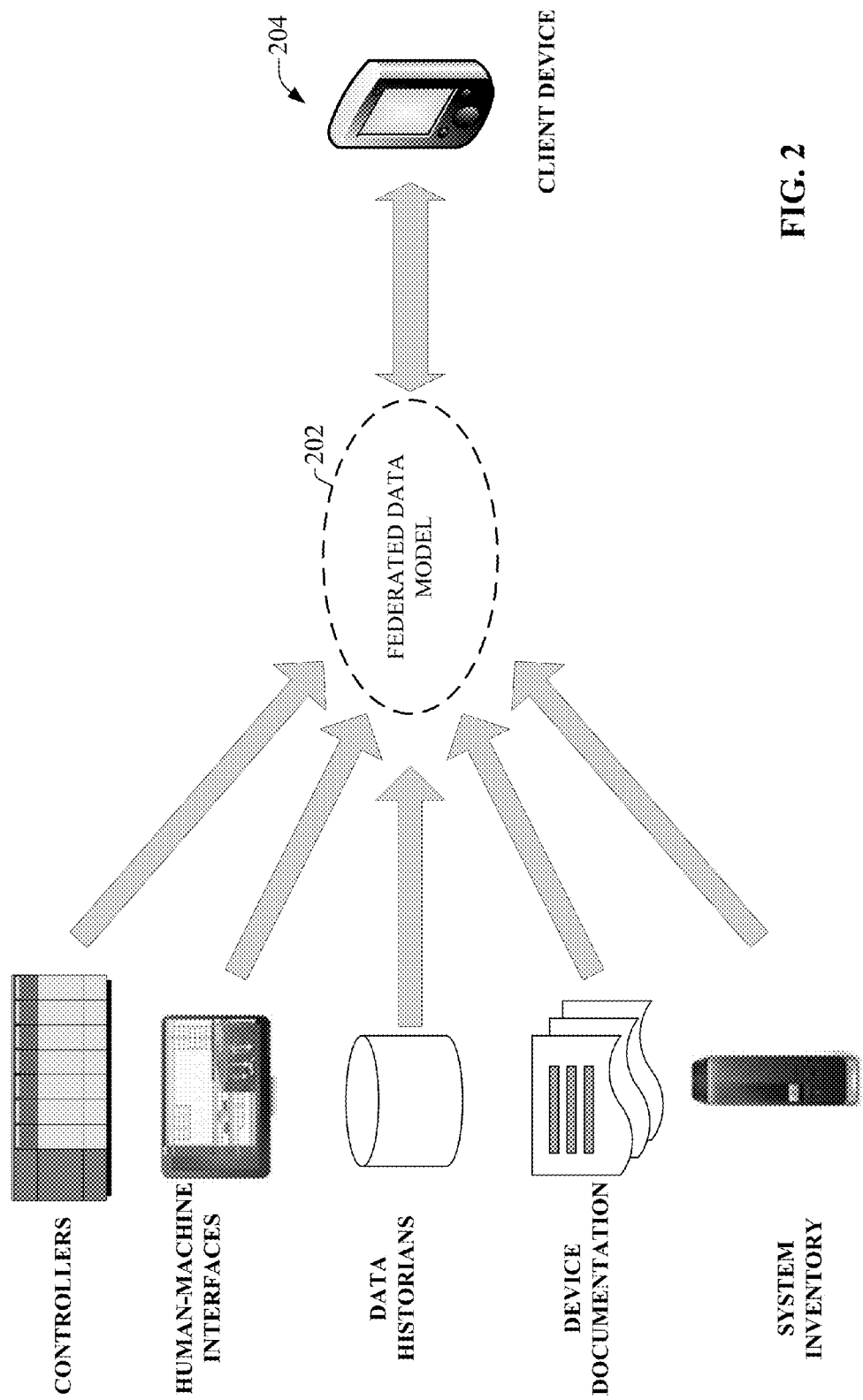
FIG. 2 is a conceptual diagram illustrating industrial data federation.

To address these and other issues, one or more embodiments of the present disclosure provide a multi-platform industrial search system that allows a user to search multiple disparate industrial data platforms for information of interest. To this end, the search system is built on a search platform that unifies plant-wide control system information from multiple diverse sources under a common namespace, or federated data model. FIG. 2 is a conceptual diagram illustrating this industrial data federation. In one or more embodiments, the multi-platform industrial search engine indexes data from multiple sources both across the industrial facility and external to the facility, including but not limited to industrial controllers, HMIs, data historians, device and system documentation repositories (e.g., drawings, manuals, knowledgebase articles, etc.), system inventory management systems, and/or other such platforms. The search system indexes and correlates this multi-platform data to yield a federated data model 202 that can be accessed and searched by a client device 204.

In an example scenario, client device 204 may submit a search request for a particular data tag (e.g., Tank1) to the federated data model 202. Based on the indexed plant-wide information recorded in the model, the industrial search system can locate all instances of the specified data tag across the disparate data sources and deliver a list of all discovered instances categorized according to data platform. For example, the search system may provide a categorized search result list that includes a first list of discovered references to the data tag in one or more industrial control programs (e.g., ladder logic, sequential function charts, etc.), and a second list of discovered instances of the data tag being displayed on one or more HMI screens. In response to selection of a search result in the industrial controller list result, the search system remotely launches an instance of the appropriate controller development application on the client device and navigates to the portion of the control program (e.g., a ladder logic rung) corresponding to the selected instance. Likewise, selection of a search result in the HMI result list causes the search system to launch a runtime instance of the HMI visualization application on the client device, and to navigate to the display screen corresponding to the selected instance.

One or more embodiments of the multi-platform search system may also include dynamic search and notification features. With a plant's industrial data indexed in the federated search model, one or more dynamic search engines can be configured to access the model automatically in the background to quickly identify issues requiring attention. When a maintenance issue is detected, the system can collect information about the issue and send a notification and the collected information to one or more plant employees determined to be suited to address the maintenance issue based on a record of the employees' skills, locations relative to the source of the issue, and/or availability.

Figure 3:
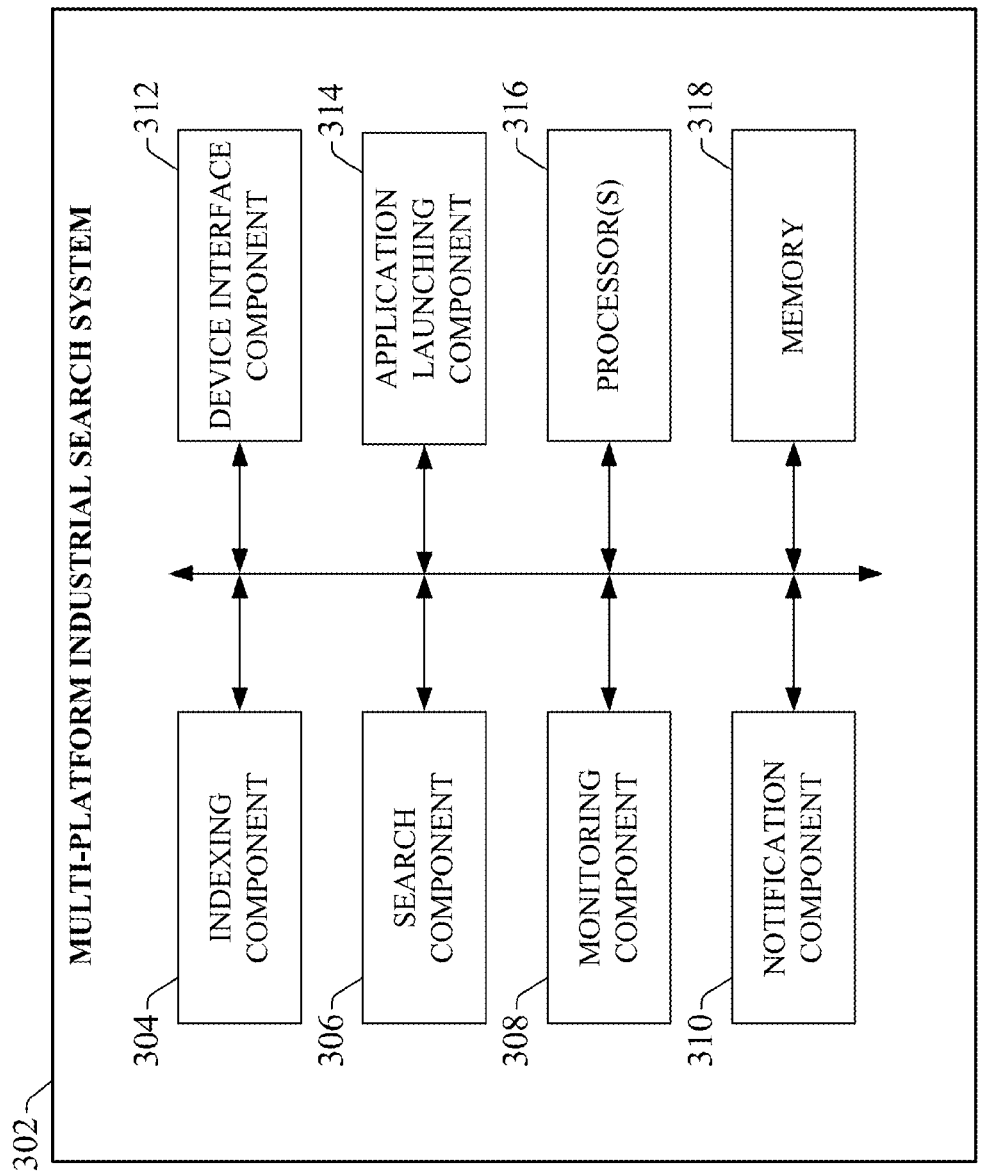
FIG. 3 is a block diagram of an example multi-platform industrial search system.

FIG. 3 is a block diagram of an example multi-platform industrial search system 302 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Multi-platform industrial search system 302 can include an indexing component 304, a search component 306, a monitoring component 308, a notification component 310, a device interface component 312, an application launching component 314, one or more processors 316, and memory 318. In various embodiments, one or more of the indexing component 304, search component 306, monitoring component 308, notification component 310, device interface component 312, application launching component 314, the one or more processors 316, and memory 318 can be electrically and/or communicatively coupled to one another to perform one or more of the functions of the multi-platform industrial search system 302. In some embodiments, components 304, 306, 308, 310, 312, and 314 can comprise software instructions stored on memory 318 and executed by processor(s) 316. Multi-platform industrial search system 302 may also interact with other hardware and/or software components not depicted in FIG. 3. For example, processor(s) 316 may interact with one or more external user interface devices, such as a keyboard, a mouse, a display monitor, a touchscreen, or other such interface devices.

Indexing component 304 can be configured to gather information about an industrial automation system and to generate a federated data model defining locations and sources of data items throughout the industrial system, as well as relationships between the data items. For example, some embodiments of indexing component 304 may be configured to deploy a crawler entity that traverses a plant network and discovers the data items and their interdependencies. The resulting indexing information generated by the crawler can be returned to the indexing component 304, which builds a searchable federated data model (e.g., federated data model 202) capable of identifying and reporting sources of specific data items or tags, as well as relevant contextual data relating to a specified data item.

Search component 306 can be configured to submit search queries to the federated data model and retrieve search results identifying locations of requested data items throughout the industrial system. Search component 306 can be configured to classify the search results according to the platform of the respective data sources on which the results were found (e.g., control logic, HMI, etc.), as well as the network and/or physical location (e.g., production area) in which the information is located. For search results corresponding to web content (e.g., vendor knowledgebase websites), the search component 306 can generate links that facilitate direct navigation to the web content.

Monitoring component 308 can be configured to monitor the indexed data items for defined trigger conditions, and to submit automated queries to the federated data model in response to detection of a trigger condition. The defined trigger conditions can correspond to conditions indicative of a performance or operational issue relating to the industrial system (e.g., a downtime condition, an abnormal condition, a non-optimal operation condition, etc.). Notification component 310 can be configured to send notifications to one or more selected recipients in response to detection of a trigger condition by monitoring component 308. The notification can include additional information about the performance issue corresponding to the trigger condition, where the additional information is retrieved from the federated data model based on the automated search query submitted by the monitoring component 308 in response to the trigger.

Device interface component 312 can be configured to exchange information between the multi-platform industrial search system 302 and a client device having authorization to access the system. For example, the device interface component can receive search queries from the client device for submission to the federated data model, as well as deliver search results and notifications to the client device.

Application launching component 314 can be configured to remotely launch appropriate platform-specific applications on the client device (or another device such as a standalone maintenance workstation) in response to selection of a search results. For example, in response to selection of a search result identifying a control logic rung on which a specified data tag is referenced, the application launching component 314 can initiate opening a control logic viewing and/or development application on the client device or another device, thereby allowing a user at the client device to view the rung of interest. Similarly, selection of a search result corresponding to an HMI screen on which the specified data tag is referenced causes the application launching component 314 to open an instance of an HMI viewing application on the client device, allowing the relevant HMI screen to be viewed on the client device. In some embodiments, the application launching component 314 can initiate launching of the platform-specific application by sending a command to a remote server in response to user selection of a search result, and receiving a subsequent command from the server to launch the appropriate application and navigate to the appropriate view. In some scenarios, the remote server may alternatively send the command to launch the application to another computing platform other than the client.

The one or more processors 316 can perform one or more of the functions described herein with reference to the systems and/or methods disclosed. Memory 318 can be a computer-readable storage medium storing computer-executable instructions and/or information for performing the functions described herein with reference to the systems and/or methods disclosed.

Figure 4:
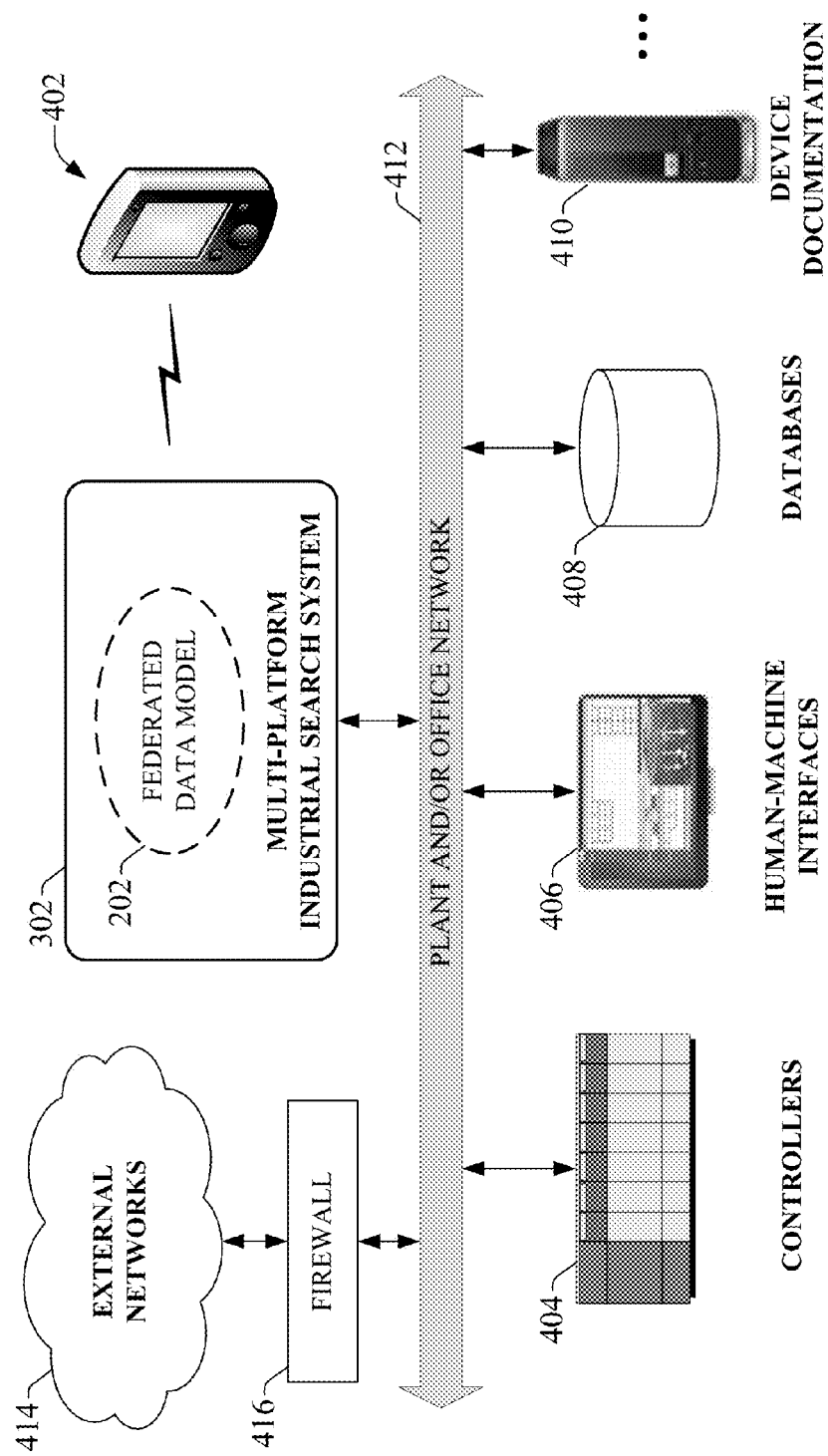
FIG. 4 is a block diagram of a generalized example architecture including a multi-platform industrial search system that discovers and indexes multi-platform data throughout an industrial environment.

FIG. 4 is a block diagram of a generalized example architecture including a multi-platform industrial search system 302 that discovers and indexes multi-platform data throughout an industrial environment. The example industrial environment depicted in FIG. 4 includes one or more industrial controllers 404, HMIs 406, databases 408 (e.g., data historians, employee databases, inventory databases, etc.), and device documentation repositories 410. The industrial environment may also include other sources of industrial data not depicted in FIG. 4, including but not limited to product inventory tracking systems, work order management systems, etc. Data sources 404-410 reside on a plant and/or office network 412. In some scenarios, data sources 404-410 may be distributed across multiple networks within the plant facility; e.g., a plant network and an office network communicatively connected through a firewall device or other network infrastructure device. Network 412 may also have access to external networks 414 such as the Internet (e.g., via firewall 416).

Multi-platform industrial search system 302—which also resides on network 412 in this scenario—discovers and indexes data items that are available in the disparate data sources 404-410 as well as on the external networks 414. The system also indexes relationships between the data items. This can include, for example, recording instances of the same data item residing in multiple data sources (e.g., recording that a data tag corresponding to a particular temperature measurement within one of the industrial controllers 404 corresponds to a data tag within one of the HMIs 406 for displaying the temperature measurement on a display screen), observing that values of certain data items are a function of other data items (e.g., an output coil associated with a first data tag in a ladder logic program is set based on a value of a second data tag used as an output condition for the rung), or other such relationships. In this way, the multi-platform industrial search system 302 automatically inventories a customer's industrial environment by discovering the industrial assets in use and their associated available data items. Search system can also discover relevant data on data sources residing on the external networks 414, including but not limited to device or machine vendor documentation, relevant online knowledgebase articles, vendor product release information, etc.

The search system 302 records the indexed information (that is, the discovered plant-wide data items and their relationships) as a federated data model 202, which can be remotely accessed and searched by a client device 402 to locate desired data items. Client device 402 can be any mobile device (e.g., mobile phone, laptop computer, tablet computer, wearable computer, etc.) or fixed location computer (e.g., desktop computer, server, operator interface, etc.) capable of remotely accessing search system 302. In some embodiments, multi-platform industrial search system 302 may be implemented on a web server, allowing client device 402 to access the federated data model via an Internet connection. The search system 302 may also be implemented on a networked local server accessible by the client device 402 via a wireless network connection. In yet another scenario, the search system 302 may be implemented on a cloud platform, where the search system executes as a cloud-based service.

In an example scenario, client device 402 may submit a search query for a particular data item (e.g., a data tag name) to the search system 302, which initiates a search of the federated data model 202 to facilitate location of the specified data item. The search system 302 then returns a list of search results to the client device 402 identifying all discovered locations of the data item across the various data sources 404-410. The system can classify the results according to type of data source (e.g., data platform) in which the result was found. In some embodiments, the system can also classify the results according to location within the plant environment (e.g. production line, workcell, etc.). For example, the results may include a first list of controller logic results identifying control logic rungs on which the desired data item is referenced, and a second list of HMI screen results identifying HMI screens on which the desired data item is displayed. When a search result is selected at the client device 402, the search system can also remotely launch the appropriate platform-specific application for viewing the selected result (e.g., an HMI viewer, a control logic viewing/development environment, an electronic document reader, etc.).

Figure 5:
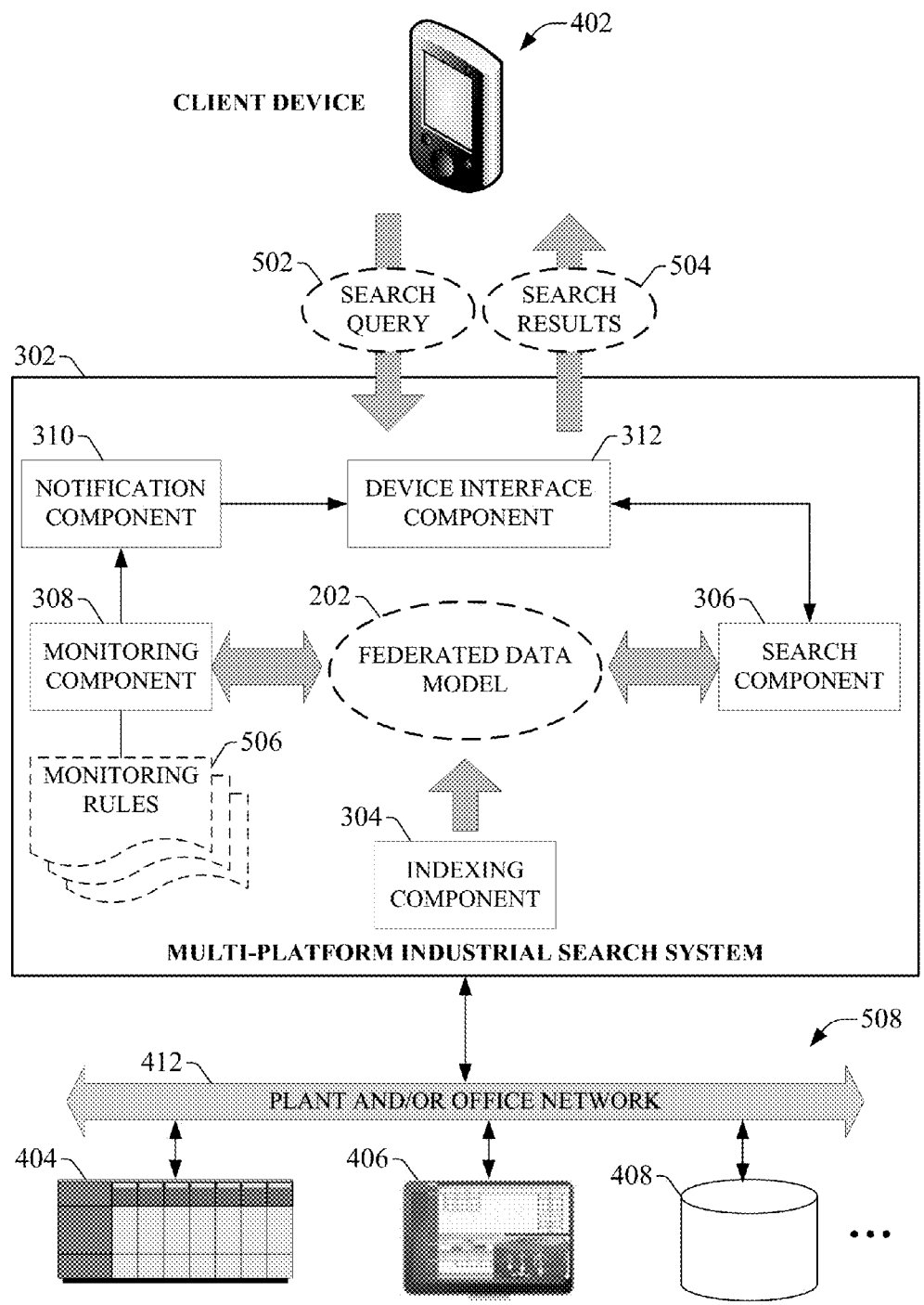
FIG. 5 is a block diagram illustrating components of the multi-platform industrial search system.

FIG. 5 is a block diagram illustrating components of the multi-platform industrial search system in more detail. In some embodiments, the search system may be implemented on a server or other computing device that resides on plant and/or office network 412. In other embodiments, the search system 302 may be implemented on a web server, allowing client devices to remotely search the federated data model 202 via a web connection. In still other embodiments, the search system may be implemented as a cloud-based service that executes on a cloud platform, as will be discussed in more detail herein.

Multi-platform industrial search system 302 includes an indexing component 304 that collects information about available data items distributed across a customer's industrial environment, and generates a federated data model 202 representing a searchable unified view of the discovered data. The indexing component 304 is configured to discover data items on multiple disparate platforms, including but not limited to industrial controllers 404, HMIs 406, databases 408, electronic documentation libraries, inventory tracking systems, work order management systems, etc. In some embodiments, indexing component 304 can discover available data items by deploying discovery agents on network 412. These agents can traverse network 412 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., controller tags, HMI tags, alarms, notifications, events, etc.), indexing component 304 can manage and deploy device-specific or platform-specific agents configured to extract and analyze information from specific types of devices or data platforms (e.g., controllers, HMIs, etc.). Some device-specific agents can be configured to locate application project files stored on particular device types (e.g., configuration and/or program files on an industrial controller, screen configuration files on an HMI, etc.), and extract relevant information about the devices based on analysis of data contained in these project files. By leveraging device-specific and platform-specific agents, the indexing component 304 can discover and index data conforming to many different formats and platforms.

In order to unify this disparate heterogeneous data under a common platform for collective searching, the device-specific agents can transform the collected data to a format understandable by the indexing component 304 (e.g., extensible markup language or other format), and the indexing component 304 can index this transformed data using a common indexing format compatible with the common search platform. The indexing component 304 then encodes this normalized representation of the discovered data in the federated data model 202. By unifying the distributed data under this unified search platform, the system can allow client devices to search the plant-wide data without knowledge of the rules or protocols for reading the various data source platforms (e.g., industrial controllers, HMIs, etc.)

In addition to discovery of devices and their associated data via crawling of the plant network, some embodiments of indexing component 304 can also be configured to receive uploaded configuration information from devices that support self-identification functionality. In such scenarios, industrial devices (e.g., motor drives, industrial controllers, HMI terminals, etc.) that support self-identification to the multi-platform industrial search system can be configured to auto-discover the search system when the device is deployed (e.g., when the device is placed on the plant network). For example, the device may be pre-configured with the identification of the industrial search system to which the device is to provide its identity and configuration information (e.g., a name associated with the search system, a machine identifier, a cloud or web address, etc.), or may be configured to perform a search of the plant network for compatible industrial search systems that may be present on the network. Upon discovery of the search system, the device can then package and send relevant information about the device and its available data to the indexing component 304, which integrates the reported data items in federated data model 202. The information delivered by the device can include, for example, an identity of the device, the device's type and revision, available data items or tags, known contextual information (e.g., the device's location within the plant environment), or other relevant information.

Indexing component 304 can also discover and record relationships—both explicit and inferred—between discovered data items. In some embodiments, the indexing component 304 may record these relationships by tagging discovered data items and building the search index based on these tags, such that related data items share common tags. In some scenarios, these tags may be explicitly defined by a system developer such that the indexing component determines which predefined tags should be applied to newly discovered data items. The indexing component 304 may also auto-generate tags for a given data item based on contextual information, including but not limited to rung comments associated with a controller tag, learned interdependencies between a newly discovered data item and a previously discovered data item (e.g., learn that Pump5 is associated with Tank1, and tag Pump5 as being associated with Tank1, or tag both Tank1 and Pump5 according to the larger system in which they operate), or other discovered contextual information. The indexing component 304 can associate similarly tagged data items in the federated data model 202 regardless of the platform in which they were discovered. For example, the indexing component 304 can associate common or related data items discovered, respectively, in an industrial controller, an HMI, and a data historian.

Using some or all of these techniques, the indexing component 304 can automatically build a model of the customer's industrial environment, including the disparate and multi-platform devices in use throughout the plant, their associated available data items, and relationships between these data items. This eliminates the need for plant personnel to have full knowledge of the industrial assets in use throughout the plant, since indexing component 304 can automatically inventory a given industrial environment and record discovered devices and data in federated data model 202.

Once created by the indexing component 304, federated data model 202 can be searched by monitoring component 308 and search component 306. Search component 306 is configured to search federated data model 202 in response to a search query 502 submitted by a client device 402. Client device 402 can exchange data with the multi-platform industrial search system 302 via device interface component 312, which may comprise a wired or wireless network interface, a near-field communication interface, or other such device interface suitable for the particular platform on which the search system is implemented. In some embodiments, device interface component 312 may be configured to verify an authorization of the client device 402 to access the search system prior to allowing search queries to be submitted by the client device. The device interface component 312 may authenticate the client device or its owner using password verification, biometric identification, cross-referencing an identifier of the client device with a set of known authorized devices, or other such verification techniques.

In some embodiments, the device interface component 312 may be configured to serve an interface display or dashboard to the client device 402 when the client device requests access to the search system 302. The interface display can include interface elements that allow the user of client device 402 to manually enter and submit a search query 502 to the search system 302. For example, the display may allow the user to enter a keyword, term, or phrase as a search criterion. Example search terms may include identifiers of specific devices or machines, names of production areas within the plant, product names or codes, employee names, or other such criteria. In addition to manually entered search criteria, some embodiments of the device interface component 312 can be configured to translate barcodes or Quick response (QR) codes affixed to devices or machines. For example, a user may scan or photograph a barcode or QR code attached to a device, machine, or product (e.g., a pin-stamped or laser-etched barcode affixed to a workpiece during the production process) using client device 402, wherein the barcode contains identification information about the associated component. The client device 402 can then submit identification information extracted from the barcode to the device interface component 312 as a search criterion. In yet another example, client device 402 may extract information about an industrial device or its associated process directly from the device via near field communication (NFC) and submit the extracted information to the device interface component 312. This extracted information can include, but is not limited to, a device identifier, device status information read from a status word maintained on the industrial device, alarm data extracted from an alarm register, production statistics stored on one or more data tags, or other such information.

Upon receipt of search query 502, device interface component 312 routes the query to search component 306, which searches federated data mode 202 for content relevant to the search query. Search query 502 may comprise, for example a data tag name (e.g., Tank1), a device or machine attribute, a device vendor, a name of a particular area of the industrial environment (e.g., a workcell or production line), a product name or identifier, or other such search criteria. Search component 306 searches the federated data model 202 for the search criteria identified by the search query 502, identifies data items corresponding to the search criteria, and returns a list of search results 504 to the client device via device interface component 312. Since the search results 504 may correspond to data items found on multiple disparate platforms throughout the plant environment (e.g., industrial controllers, HMIs, device documentation repositories, etc.), the device interface component classifies the results according to the platforms on which the results were found, location of the results within the plant environment (e.g., production area, workcell, etc.), or other classification criteria.

Figure 6:
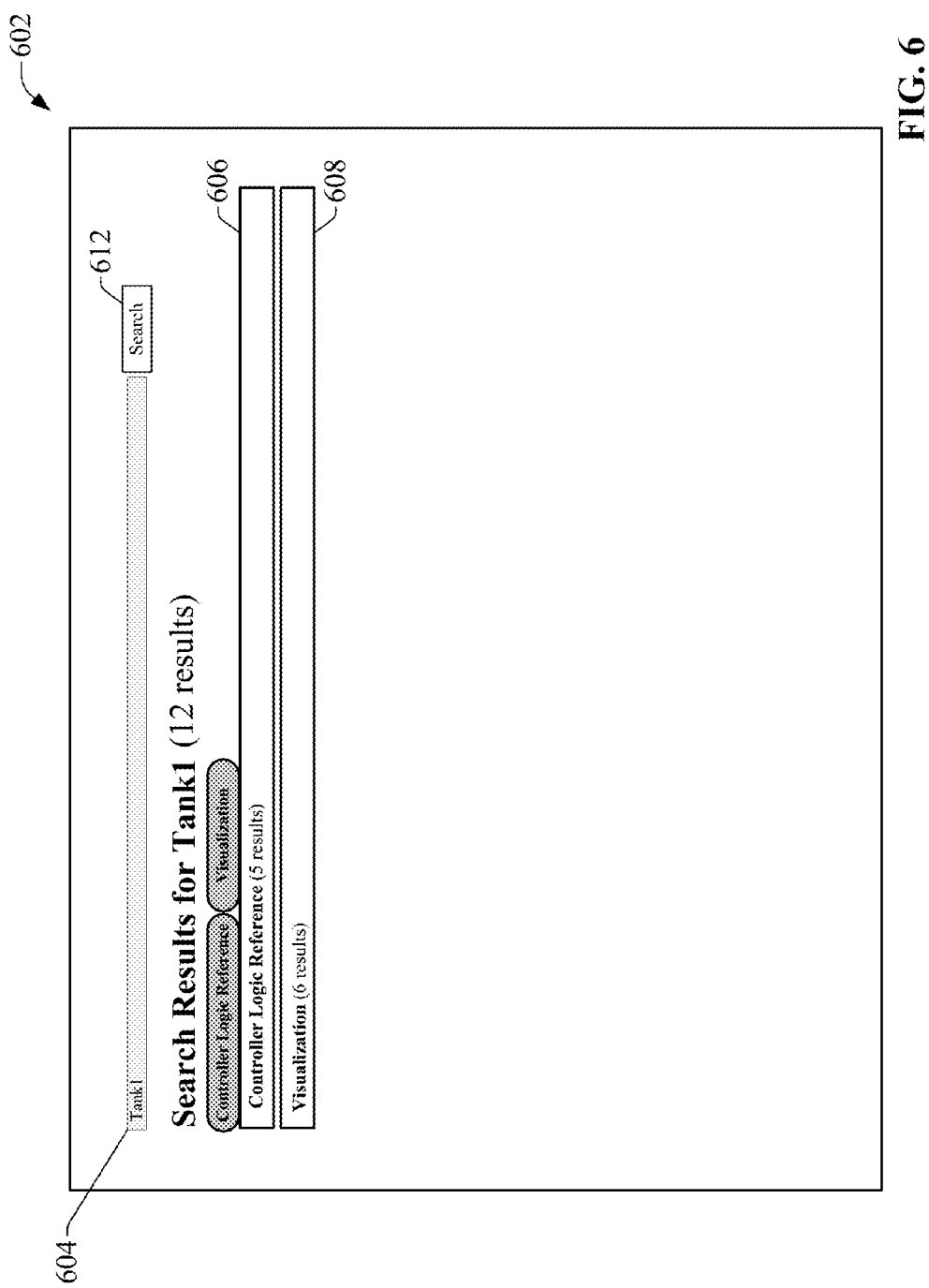
FIG. 6 is an example search result screen that can be delivered by multi-platform industrial search system.

Turning briefly to FIG. 6, an example search result screen 602 that can be delivered by multi-platform industrial search system 302 is illustrated. In this example, a search for a tag named Tank1 has been submitted to the system. The search is initiated by entering the tag name in the search window 604 and operating search button 612. In response to the query, search component 306 identifies all instances of Tank1 recorded in federated data model 202, representing all known locations of or references to data items named Tank1 throughout the plant. In this example, 12 instances are discovered—five instances of Tank1 referenced within controller logic, and six references to Tank1 on one or more HMI applications (visualization platforms). These results are segregated between two collapsible result lists—a controller logic reference list and a visualization reference list.

Figure 7:
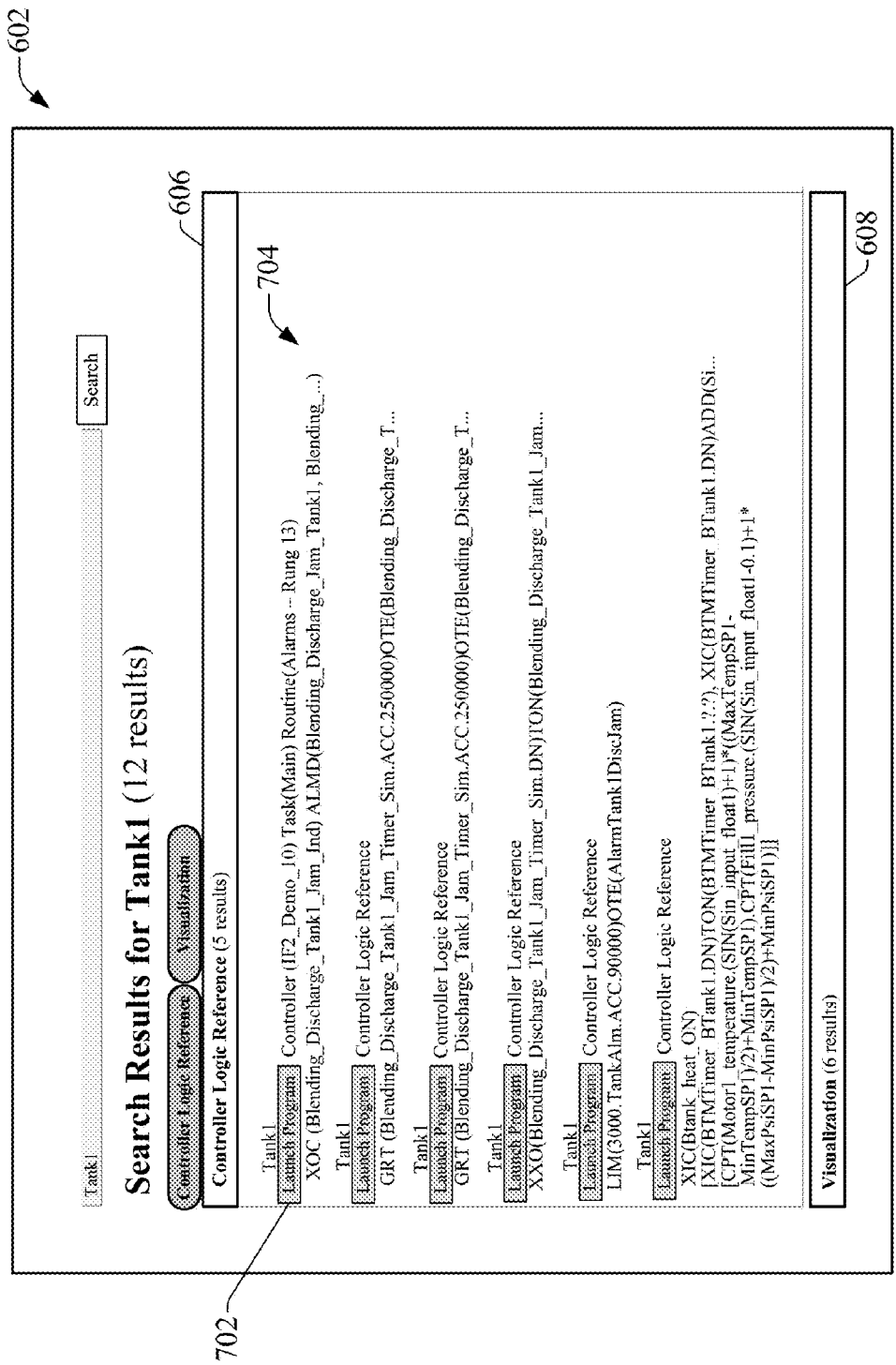
FIG. 7 is an example search result screen including an expanded list of controller logic reference results.

Selection of the controller logic reference list header 606 expands and makes visible the list of controller logic reference results 704, as shown in FIG. 7. Each item in the list of controller logic reference results 704 identifies a control logic rung on which the Tank1 data tag is referenced. In this example, each result identifies the controller (e.g., IFT_Demo_10), routine (e.g., "Alarms"), and rung (e.g., "Rung 13") on which the tag is referenced. Each result also identifies additional context for the reference, such as type of logic element associated with the Tank1 reference (e.g., normally open contact, normally closed contact, output coil, GRT function block, etc.). In some embodiments, each item in the controller logic reference results 704 may include an embedded image of the particular rung in its graphical form, including rung comments found in the source logic program to provide additional information and context about the result prior to user selection.

Figure 8:
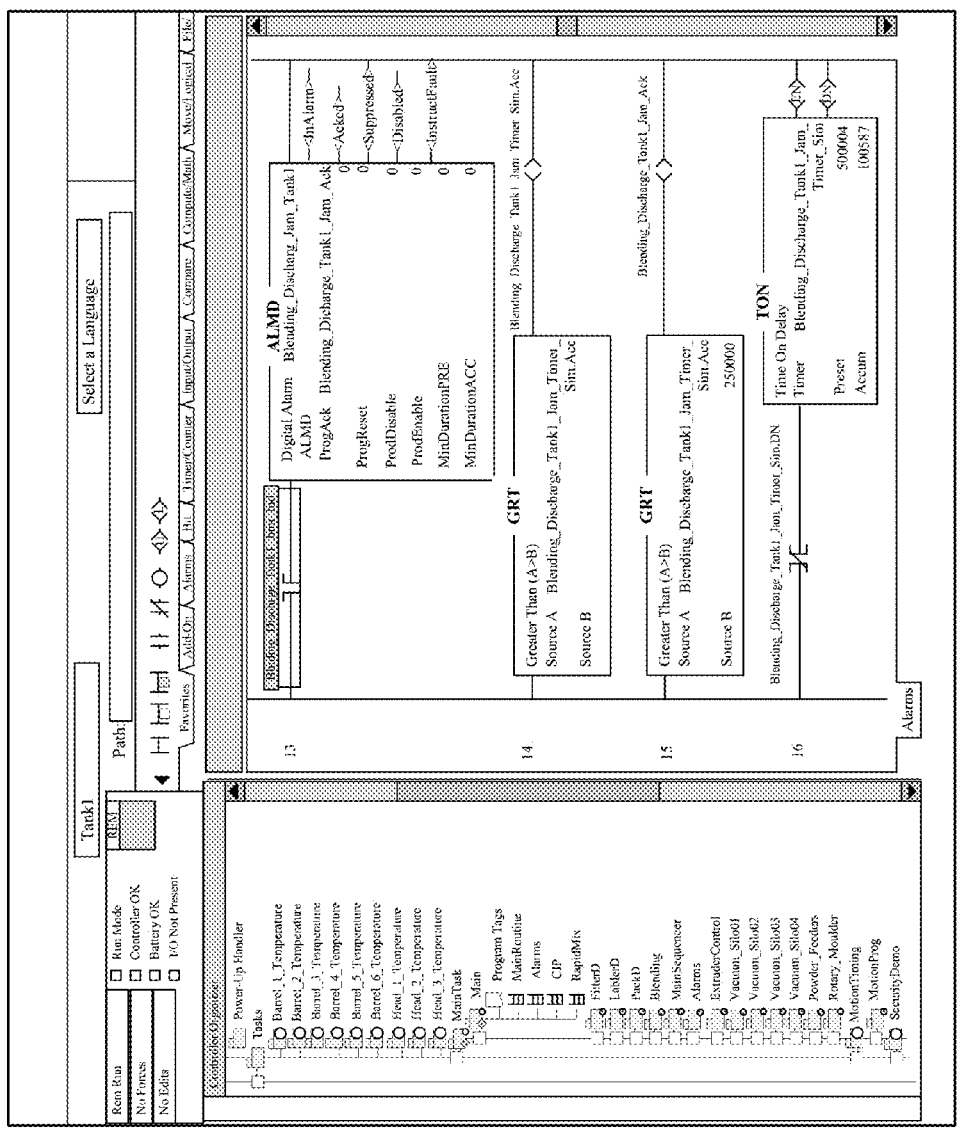
FIG. 8 is an example controller logic development screen launched by the industrial search system in response to selection of a "Launch Program" button corresponding to a controller logic reference result.

Each result also includes a "Launch Program" button 702. Selection of a "Launch Program" button 702 causes the search system to launch an appropriate program or application for viewing the selected result in context on the client device. In the present example, selection of a "Launch Program" button 702 corresponding to one of the controller logic reference results causes the search system to launch a controller logic viewing and/or development environment on the client device, as shown in FIG. 8. The search system also navigates to the location within the controller logic corresponding to the selected search result. That is, after launching the controller logic application 802, the system navigates to the particular controller program, routine, and rung number corresponding to the selected instance of Tank1. The controller logic application 802 provides a runtime view of the selected logic program on the client device, including live rung statuses and tag data values. In some embodiments, the live data for animating the runtime presentation of the controller logic can be routed to the client device by the search system 302. In such embodiments, the search system may establish a communicative link between the client device 402 and the selected industrial controller, allowing real-time data read from the controller's data table to be passed to the client device 402 to drive the runtime presentation of the controller logic.

Figure 9:
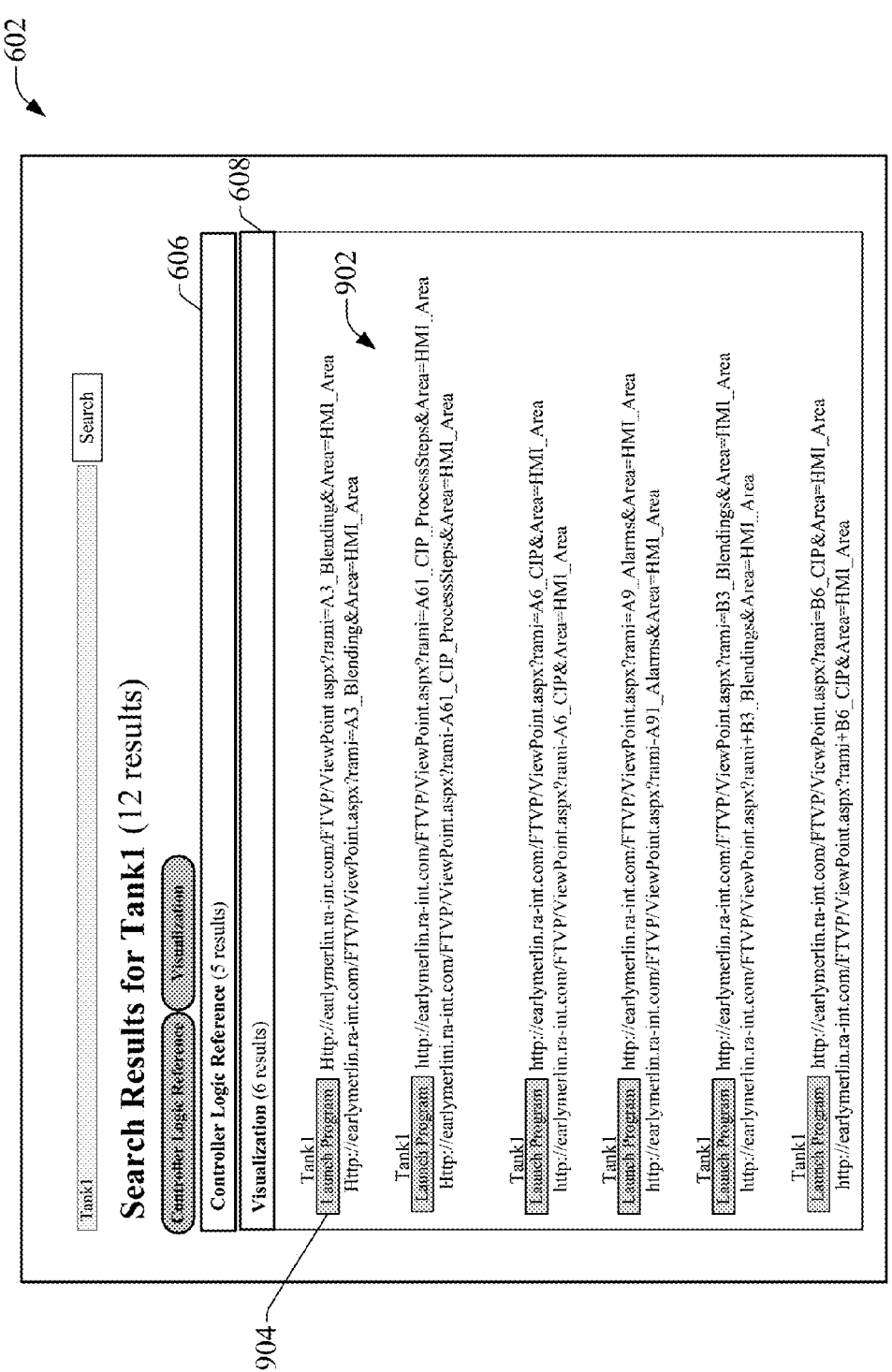
FIG. 9 is an example search result screen including an expanded list of visualization reference search results.
Figure 10:
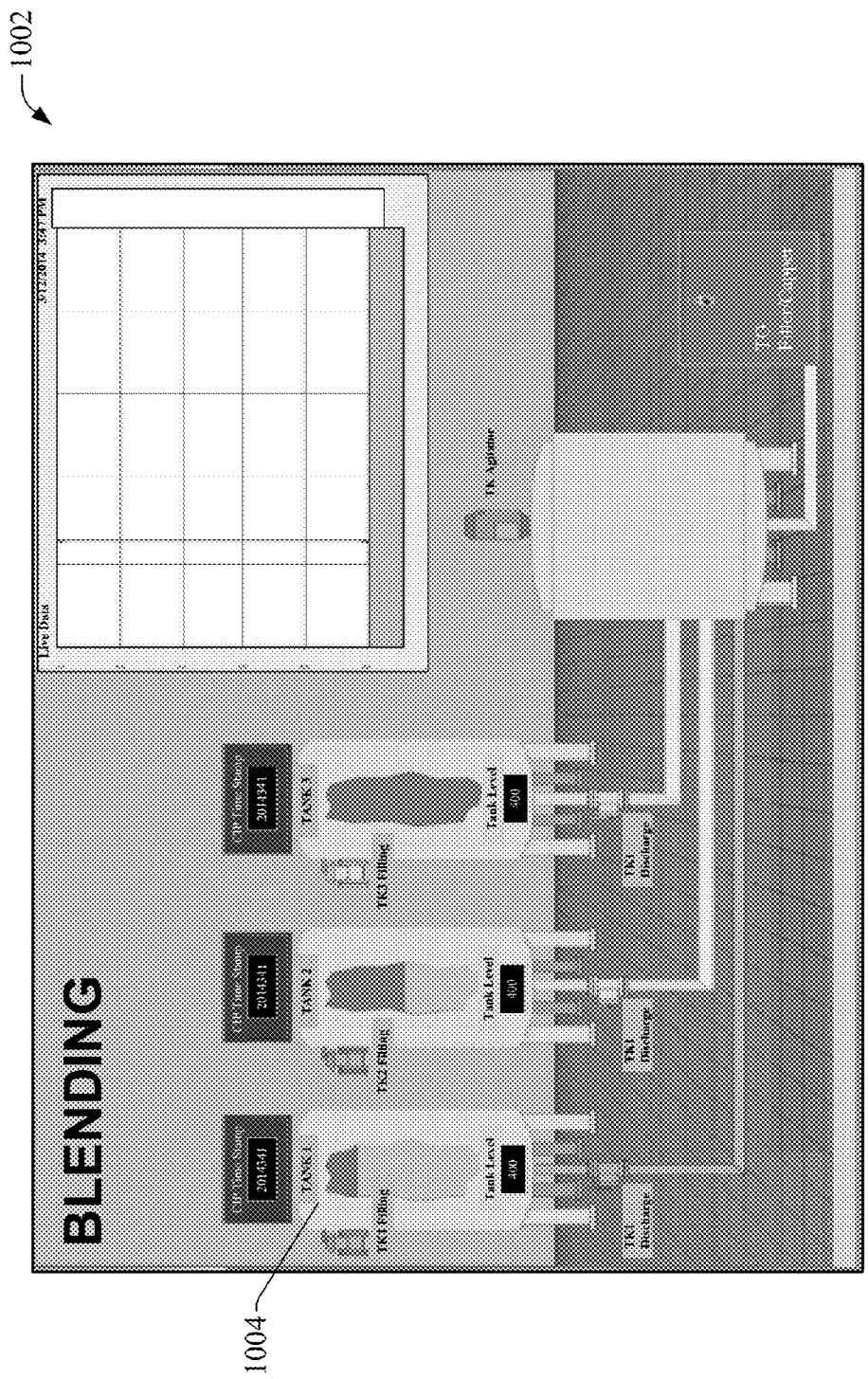
FIG. 10 is an example HMI screen invoked by selection of a "Launch Program" button associated with a visualization reference search result.

As shown in FIG. 9, selection of the visualization reference list header 608 expands and makes visible the visualization result list 902. Similar to the list of controller logic reference results 704, each result in the visualization result list 902 identifies the HMI location for the corresponding Tank1 reference. In particular, each result identifies the HMI application and interface screen on which the Tank1 data tag is referenced. In some embodiments, each item in the visualization result list may include a thumbnail image of the corresponding HMI screen to provide context. Selection of a "Launch Program" button 904 next to one of the visualization reference results causes the search system to launch the appropriate visualization program on the client device for viewing the selected HMI display screen. FIG. 10 illustrates an example HMI screen 1002 invoked by selection of a "Launch Program" button 904. In this example, HMI screen 1002 includes a graphic 1004 for Tank 1, which includes an animated tank level graphic, a numeric tank level indicator, and an animated discharge valve for the tank. As with the controller logic application described above, HMI screen 1002 provides a live runtime view of the process being visualized on the client device, where the animation and numeric displays are driven using real-time data retrieved by the search system and delivered to the client device. Launching of applications by the search system is discussed in more detail herein.

In some embodiments, the application launching component 314 can enforce user-specific and/or role-specific permissions in connection with launching applications and viewing search results. For example, a system administrator may specify that any users with suitable authorization to access the search system may view HMI screens, but only certain pre-specified users or user roles (e.g., maintenance roles, engineering roles, etc.) are to be permitted to launch controller logic applications via the search system. Accordingly, when a request to view a search result is received by the search system, the application launching component may first determine the identity and/or role associated with the source of the request (e.g., based on verification information provided by the user at login) before determining whether the application associated with the selected search result may be launched on the specified client device. In this regard, the system may include tools that allow a system administrator to define one or more user roles and to associate each type of application or data platform with one or more of the defined user roles, where the specified roles correspond to those roles which are allowed to launch the associated application.

As noted above, one or more embodiments of the search system can also access off-premise data sources, including but not limited to web-based content (e.g., vendor knowledgebases or technical notes). Moreover, some embodiments of the search component 306 may be configured to correlate local search results (that is, search results located on data sources within the plant facility) with information available on web-based data sources. For example, if a local search result relates to a particular model of industrial device, the search component 306 may search external web-based data sources for additional information about that device (e.g., knowledgebase articles, on-line documentation, technical notes, information regarding the latest firmware revision for the device, etc.). The search component 306 can then present links to these external search results in association with the appropriate local search results.

In one or more embodiments, the search component 306 may also be configured to filter search results based on a current location of the client device 402 from which the search query was received. According to such embodiments, upon determining a set of search results in response to a search query, the search system may determine the location of the client device 402 (or the user of client device 402; e.g., using a location tracking badge carried by the user) and present only a subset of the total search results determined to be relevant to the user's present location. For example, if the user is determined to be located near a particular production line or within a particular workcell, the search component 306 may identify the subset of search results corresponding to industrial devices or machines located within that section of the plant facility.

In addition to processing search queries submitted by a user via a client device, some embodiments of the multi-platform industrial search system can also support automated dynamic searching. Retuning now to FIG. 5, multi-platform industrial search system 302 includes a monitoring component 308 configured to monitor one or more performance or operational metrics of an industrial system to identify issues requiring attention by an operator or maintenance expert. In response to detection of a performance or operational issue, the monitoring component 308 can perform an automated search of federated data model 202 to collect search results relevant to the detected issue. A notification component 310 can then deliver a notification of the detected issue together with the relevant search results to one or more client devices associated with selected plant personnel determined to be best suited to address the issue.

In an example embodiment, monitoring component 308 may monitor selected data items of industrial system 508 according to defined monitoring rules 506. Monitoring rules 506 can define, for example, which data tags of the various data platforms distributed across industrial system 508 are to be monitored, as well as criteria indicative of performance issues that, when determined to be true, will trigger an automated search and personnel notification. The monitoring rules 506 can also define which employees are to be notified in response to each type of detected performance issue. As an example criterion, a monitoring rule may define that, when a temperature value associated with data tag Tank3Temp exceeds a defined setpoint value, an automated search for Tank3Temp is to be performed on federated data model 202 is to be performed. The monitoring rules may also specify one or more crucial alarm tags that, when determined to be active, require an action to be taken by maintenance personnel. The rule may also define one or more other relevant data tags to be searched in order to provide additional context for the issues. The rule can also define one or more plant employees to whom the search results are to be sent in response to detection of the issue. The rule may specify the employees explicitly (e.g., be defining one or more user identities or user-specific client devices), or may specify a category of employee (e.g., a user role or area of expertise) such that specific plant personnel associated with the defined category can be identified and notified.

When the monitoring component 308 determines—based on monitoring of the defined data items—that a criterion indicative of a performance issue has been satisfied, the monitoring component generates a search query designed to collect information relevant to the detected performance or operational issue, as defined by the monitoring rules 506. This can include, for example, searching federated data model 202 for the one or more data tags or device attributes whose monitored values satisfied the defined criterion. The search may also include querying for related data items determined to be relevant to the detected performance or operational issue, including but not limited to other device statuses, telemetry values, or operator inputs that may have an effect on the data tag or device attribute being searched. These related data items may be explicitly defined by the monitoring rules for each defined performance issue, or may be dynamically identified based on the relationships between the data items defined in the federated data model 202. For example, when monitoring component 308 performs an automated search for Tank3Temp in response to detecting an excessive Tank 3 temperature, the system may locate a reference to this data tag on a rung of a controller logic program (a direct reference). The system can then identify other rungs and address within the program that affect the rung on which the Tank3Temp reference is found (indirect references). The monitoring component 308 may cycle through the indexed information recorded in the federated data model 202 multiple times in an iterative fashion until all such relationships determined to be relevant to the performance or operational issue are discovered.

When all relevant search results for a detected performance or operational issue have been collected, notification component 310 identifies one or more employees to be notified of the detected issue. The system may identify suitable recipients based on the monitoring rule definitions, as described above. In some embodiments, the system may narrow the list of suitable recipients further based on current context information, including but not limited to each potential recipient's current location or availability. For example, the search system 302 may determine each potential recipient's current location by tracking each user's respective client devices, and deliver notifications only to those users within a defined radius of the affected machine or device.

The search system 302 may also interface with a separate availability tracking system that tracks each user's current availability based on work schedules, a current work activity reported by each user, or other such information.

When all eligible recipients have been identified, the notification component 310 then delivers a notification of the detected issue to all client devices associated with the target recipients, together with the relevant search result links. In this way, the search system immediately alerts maintenance personnel when a system performance issue is detected, and provides relevant contextual information (links to relevant HMI screens, sections of controller code, device documentation, etc.) that allows the maintenance personnel to immediately begin diagnosing and addressing the problem via their personal client device. Since the search system can launch HMI screens and control logic viewing applications on the user's client device, the system provides a means for maintenance personnel to remotely diagnose the maintenance issue via their client device without being physically present at the affected machine, device, or industrial system.

Figure 11:
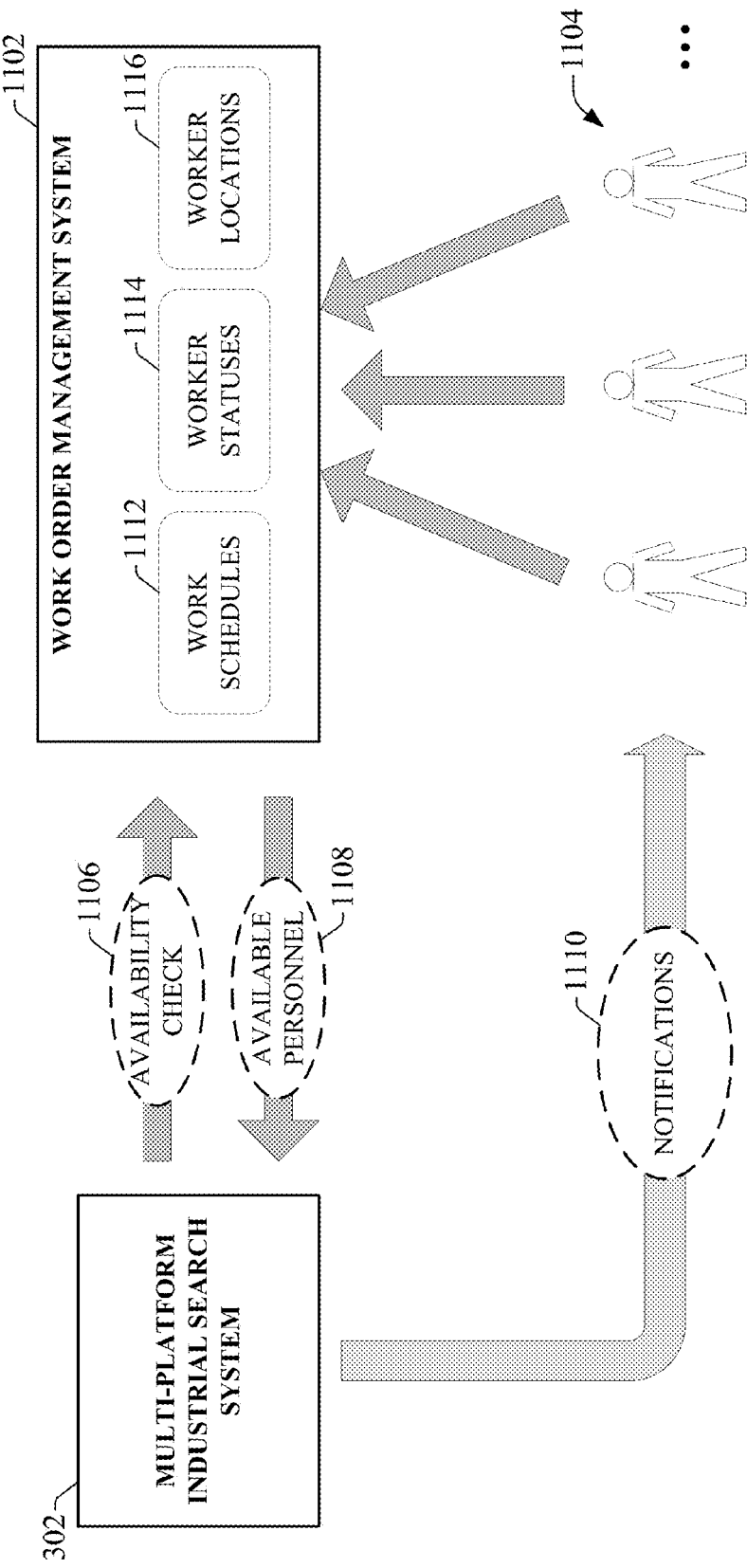
FIG. 11 is a block diagram illustrating a generalized architecture for coordinating maintenance activities.

In one or more embodiments, the multi-platform industrial search system 302 may also work in conjunction with a work order management system to coordinate repair activities among maintenance staff. FIG. 11 is a block diagram illustrating a generalized architecture for coordinating maintenance activities. In some embodiments, work order management system 1102 may be a separate worker activity tracking system that can be accessed by the search system 302 to facilitate selection of suitable available personnel for notification of a newly detected maintenance or performance issue. In other embodiments, the work order management system 1102 may be integrated with multi-platform industrial search system 302.

Work order management system 1102 can track worker availability based on known work schedules 1112 of each employee (e.g., scheduled work shifts, scheduled vacation days, etc.), as well as current worker statuses 1114 of each employee. In some scenarios, worker statuses 1114 may be determined based on current activities reported by the respective employees. For example, a maintenance person currently engaged with investigating a downtime occurrence on a particular workcell may report this activity as their current status (e.g., via their client device). Upon completion of this activity, the maintenance person may then report an updated status indicating availability to work on other issues. Worker statuses 1114 may also be updated automatically by the work order management system 1102. For example, in response to a new work order being assigned to a particular employee, the work order management system 1102 may automatically update that employee's status to "unavailable" until the work order is reported as having been completed. Work order management system 1102 may also track worker locations 1116; e.g., by monitoring the locations of each employee's personal client device, by monitoring traceable badges worn by each employee, or by other such means.

In the example architecture illustrated in FIG. 11, when multi-platform industrial search system 302 identifies a problem with an industrial system within the plant environment using the techniques described above, the search system identifies a set of qualified people—both employees within the plant as well as outside support personnel—capable of addressing the detected issue, as described above. The set of qualified people may include one or both of plant employees (e.g., operators, maintenance personnel, engineers, etc.) or outside personnel (e.g., product vendors, OEMs, system integrators, etc.). The search system 302 then submits an availability check 1106 to the work order management system inquiring which of the set of qualified people are currently available to address the issue. In response, work order management system 1102 determines the availability of each identified person based on the work schedules 1112 and worker statuses 1114. Work order management system 1102 filters out employees determined to be unavailable based on their known work schedule and/or current status. The system 1102 may also filter out workers determined to be located outside a defined radius of the affected area based on the worker location information. In this way, only available personnel nearest to the area requiring investigation will be notified by the search system 302.

Based on this analysis of worker availability, work order management system 1102 can return a filtered list of available personnel 1108 to the search system 302, which can then send notifications 1110 of the detected issue to client devices associated with the available personnel. The search system 302 can also send a confirmation to the work order management system 1102 that work orders have been pushed to the identified employees, allowing the work order management system 1102 to update the current statuses of those employees accordingly. In this manner, the search system 302 intelligently and automatically drives maintenance activities within the plant. In some embodiments, the search system 302 and/or the work order management system 1102 can schedule maintenance and repair activities based on the nature of the detected problem, estimated steps required to solve the issue, estimated time to complete repairs of a given issue, etc. By predicting time-to-completion for a detected problem (measured from the time at which the notification for the problem was delivered to the selected plant personnel), the search system 302 can pre-schedule and queue work orders in the event that multiple issues are detected during a work shift.

In some embodiments, the search system 302 (alone or in combination with the work order management system 1102) can be combined with icon-based searching to allow a user to manually send work orders or notifications to other members of the maintenance staff. For example, as a first maintenance person is investigating a performance or operational issue with one or more industrial assets, the user may determine that a particular industrial device or machine requires attention from another member of the maintenance staff with greater expertise with that device. Using a display interface delivered to the user's client device by device interface component 312, the first maintenance person can select an icon to trigger sending of a work order to the appropriate expert. In one or more embodiments, the search system 302 may automatically select the appropriate recipient for the work order based on known areas of expertise or maintenance action histories for respective plant employees. The search system 302 may also bundle additional information relating to the active maintenance issue (including but not limited to the search results collected by monitoring component 308 when the issue was first detected), and include this information with the work order. The search system 302 can also bundle information about the specific device for which assistance is required. For example, the first maintenance person may select an icon representing the industrial device for which assistance is requested. In response, the search component 306 can initiate a search of federated data model 202 to identify multi-platform information relevant to the selected device. This bundled information can be pushed to the recipient's personal device, providing the recipient with both a notification, a location of the device requiring attention, and relevant information about the currently active maintenance issue.

Some embodiments of search system 302 can also be configured to coordinate the activities of multiple maintenance people working together on the same maintenance issue. In an example scenario, multiple employees may be working on a downtime issue discovered and reported by monitoring component 308. In these embodiments, the search system 302 may include a knowledgebase of solution workflows that can be followed to address known performance or operational problems. Accordingly, when the search system 302 delivers notifications of the detected issue to the respective maintenance personnel, the notifications may include a selected workflow for addressing the issue. The workflows define one or more sequences of steps (e.g., repair steps, operational steps, sequences of manual control panel operations, related information, etc.) to be followed in order to address the issue. The workflows can be displayed on each user's client device in a dynamically updating manner, such that, when a user completes a step on the workflow, the search system 302 can update the workflow presentations on each client device to reflect the completion of the step. In various embodiments, the search system 302 may determine completion of a workflow step based on a manual indication received from the user via the display interface, or by monitoring values of relevant data items indexed in the federated data model (e.g., device or machine status indications, telemetry values, pushbutton inputs, selector switch positions, etc.). Upon determining that a particular step in the workflow has been completed, the search system 302 can deliver updated workflows to each client device to reflect the completed step and to guide the maintenance personnel to subsequent steps in the repair process.

In another aspect, one or more embodiments of the search system 302 can monitor actions taken by the plant personnel in connection with resolving the detected issue; e.g., by monitoring relevant data items via the federated data model 202. Events monitored by the system during a maintenance operation can include, but are not limited to, manual interactions with control panels (e.g., pushbutton statuses, selector switch positions, etc.), HMI screen navigations, machine or device parameter modifications, or other such information. The search system can collect additional information about actions performed by recording maintenance reports submitted by the maintenance personnel in connection with the issue. The search system 302 can then record the actions performed by the plant personnel to address the issue in a format that can be re-presented to plant personnel if the same maintenance issue is detected at a future time. In some embodiments, the search system 302 can record these actions in the form of workflows that can be delivered to client devices to guide the user through the correction process, as described above.

In some embodiments, when a problem with a device or collection of industrial assets is discovered as a result of the dynamic search performed by monitoring component 308, the search system 302 can perform a supplemental search of federated data model 202 to identify similar assets in use elsewhere in the plant environment, and flag these other assets as being at risk of the same problem. The search system 302 can then deliver supplemental notifications to selected plant personnel identifying these similar or related assets. These supplemental notifications may include recommended preventative maintenance actions to be performed on these similar or related assets to prevent the problem from occurring elsewhere in the plant. In a related aspect, the search system 302 may observe the worker actions that were carried out to address the issue on the original industrial asset (e.g., by monitoring the relevant data items via the federated date model 202, by reading maintenance reports submitted by the maintenance personnel in connection with the issue, etc.), and generate the recommended preventative maintenance action based on these observations. Example preventative maintenance actions that may be recommended by the search system 302 may include for example, replacement or reconfiguration of a device, modification of one or more device parameters, or other such maintenance action. Knowledge of equipment or maintenance steps that were performed to address the original problem can be used by the system to adapt future search results, such that more important information is presented higher in the search result list.

Monitoring component 308 can also track changes or additions to vendor knowledgebases or websites (external to the plant) and generate notifications in response to detecting relevant new information about a device in use within the plant facility. For example, the monitoring component 308 may detect that a vendor has reported availability of a new hardware or software revision for a device known to be in service within the plant (e.g., a motor drive, industrial controller, etc.), published a new technical note describing a newly discovered operational problem with a device and recommended corrective measures to address the issue, or other such information. In response, the search system 302 can deliver a notification—including a link to the source of the new information—to selected personnel determined to be best suited to review the new information. The system can select the relevant personnel based on, for example, the particular device to which the information pertains, the location of the affected device within the plant (e.g., the production area or workcell), or other relevant considerations. For example, if a product vendor reports a newly discovered problem with a particular model of a variable frequency drive (VFD), the system may select the relevant personnel based on the type of recommended countermeasure indicated in the vendor's technical note reporting the issue. If the countermeasure requires only a modification to a configuration setting change, the system may deliver the notification to one or more maintenance personnel capable of performing the change. Alternatively, if the technical note recommends a complete device replacement, the system may send the notification to one or more plant engineers and/or local vendors.

Since the search system 302 can monitor plant-wide information across multiple disparate platforms, the system can track when parts or spare devices are checked out of inventory by monitoring an inventory database maintained by plant personnel. In some embodiments, the search system 302 can also track where parts taken from inventory are taken and used. For example, the search system 302 may determine that a particular replacement motor drive has been checked out of inventory by monitoring the inventory database. The database may also include a record of which workcell or machine the replacement motor drive is to be installed, and this information can be recorded by the search system. Subsequently, users can access the search system 302 and request tracking information for the motor drive, or instruct the search system to generate inventory information for all deployed motor drives and their current locations throughout the plant.

Figure 12A:
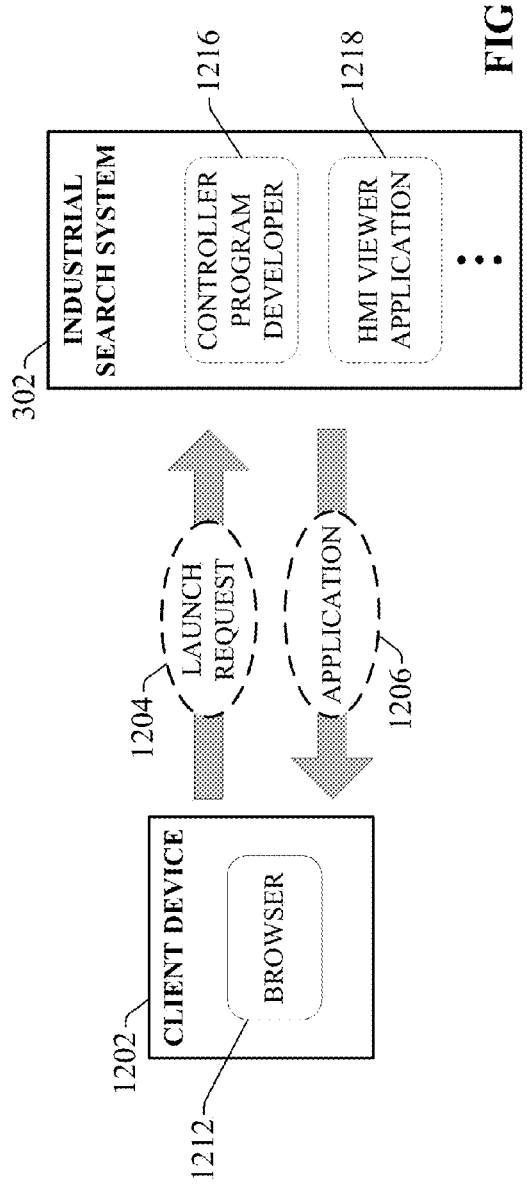
FIG. 12A is block diagram illustrating remote launching of an application on a client device.
Figure 12B:
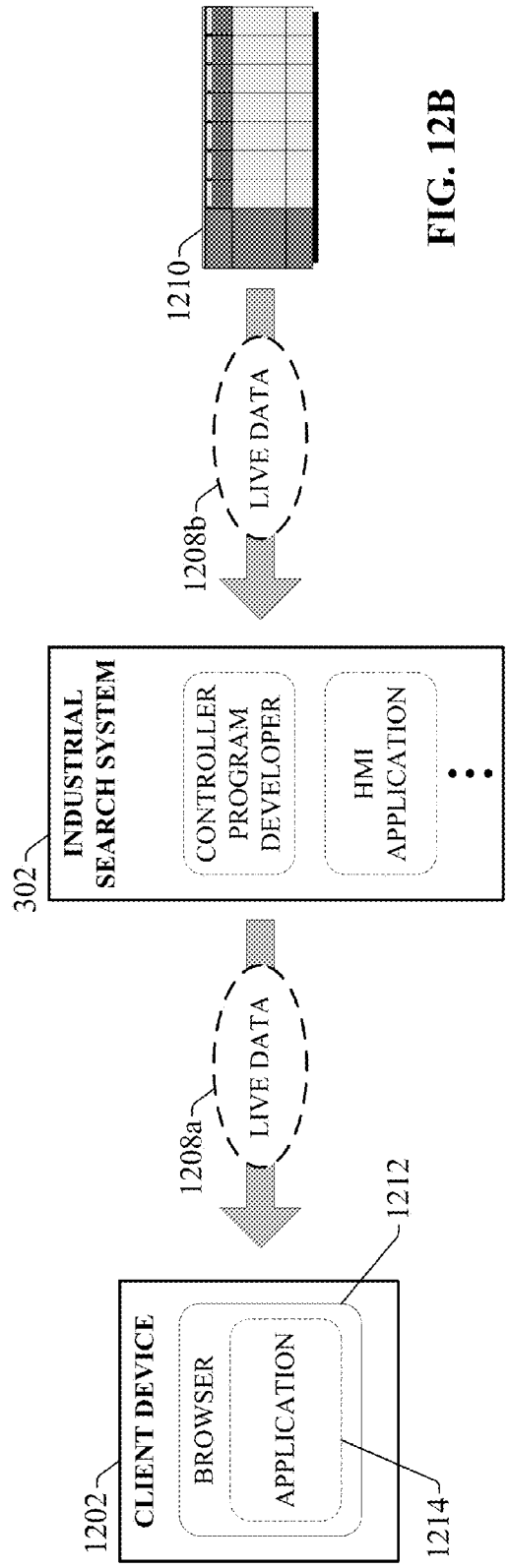
FIG. 12B is a block diagram illustrating delivery of live data to an application that has been remotely launched on a client device by the industrial search system.

As noted above, the multi-platform industrial search system can remotely launch, on a user's client device, the appropriate application necessary to view a selected search result (e.g., in response to selection of a "Launch Application" button associated with the search result, as illustrated in FIGS. 6-10). FIGS. 12A and 12B are block diagrams illustrating remote launching of an application on a client device according to one or more embodiments. In this example, industrial search system 302 is implemented on a hardware platform (e.g., a web server, a stand-alone appliance, etc.) on which a number of industrial applications are installed. These applications can include, but are not limited to, a controller program development application 1216 (e.g., ladder logic editing software) and an HMI viewer application 1218. When the industrial search system 302 delivers a set of search results to client device 1202 (e.g., a list similar to those depicted in FIGS. 6, 7, and 9), the user may opt to view a particular search result by selecting the "Launch Program" button (or similar control) associated with the selected result, causing the client device 1202 to send a launch request 1204 to the search system 302. Depending on the platform of the selected result (e.g., controller logic reference, visualization screen, etc.), the search system 302 can remotely launch, on client device 1202, an instance of the particular application 1206 needed to view the selected search result.

For example, if the user selects a result corresponding to a reference on an HMI screen, the search system 302 will remotely launch an instance of HMI viewer application 1218 on client device 1202, load the HMI application containing the HMI screen corresponding to the selected result, and navigate to the screen containing the reference of interest. In some embodiments, the search system 302 can serve a web-compatible version of the HMI viewer application on a browser application 1212 running on client device 1202. Similarly, if the user selects a result corresponding to a reference to a data tag on a rung of a controller logic program, search system 302 can remotely launch an instance of the controller program development application 1216 on client device 1202. In some embodiments, the search system 302 can instantiate the controller program developer application as a remote node that allows the user to modify the controller programming remotely from client device 1202.

Once the appropriate application has been launched on client device 1202, the search system 302 can place the application 1214 on line with the necessary data source for populating the client-side application with live data 1208. For example, search system 302 can initiate a communication link to industrial controller 1210 and retrieve live data 1208 from the data tags needed to populate application 1214 (e.g., to display live data or drive graphic animation on an HMI screen, to provide a runtime view of controller logic, etc.). Other data sources can include, but are not limited to, motor drives (e.g., VFDs), cameras (e.g., vision cameras, 2D barcode readers, etc.), instrumentation and telemetry devices, or other such data sources.

Although FIGS. 12A and 12B depict applications 1216 and 1218 as residing on the same server as industrial search system 302, the applications 1216 and 1218 may reside on a different server or device (e.g., an application server, an electronic operator interface device, etc.) in some implementations. In such scenarios, the industrial search system 302 will respond to the launch request 1204 by accessing the application server and instructing the server to remotely launch the appropriate application on the client device 1202, either via direct communication with the client device 1202 or using the industrial search system server as a passthrough. In some embodiments, the search system 302 (or separate application server) can deliver the application to the client device as interactive web pages (e.g., HTML pages) that facilitate remote viewing and modification of data on the target data source via interaction with the web pages (e.g., the industrial controller, the HMI terminal, etc.). In other embodiments, the search system 302 can deliver the application by initiating a remote desktop on the client device and launching the application within the remote desktop environment.

Figure 12C:
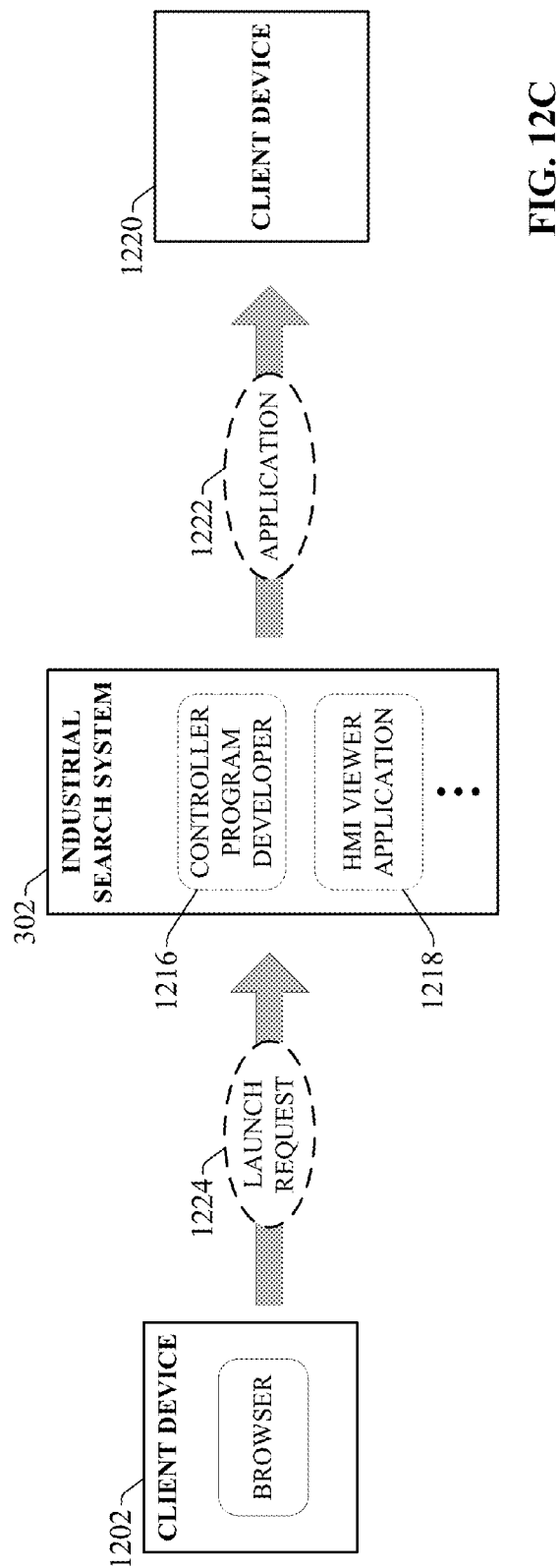
FIG. 12C is a block diagram illustrating launching of an application on a first client device in response to a launch request received from a second client device.

In some embodiments, the search system 302 may deliver the application to a different client device or computer (e.g., a desktop computer, a laptop computer, a workstation, etc.) other than that which initiated the launch request. FIG. 12C is a block diagram that illustrates launching of an application 1222 on a different client device 1220. This implementation may be useful if client device 1202 is a small mobile device that is not conducive to optimal interaction with the particular application being launched. In such scenarios, the search system 302 may be pre-configured to associate certain types of applications (e.g., HMI application, controller logic application, etc.) with specific identified client devices, such that selection of a search result associated with an application causes the industrial search system to, in response to receipt of launch request 1224, launch the application 1222 on the client device 1220 designated for that application. In some embodiments, the selection of the target device may be a function of both the application type and the user or user role from which the launch request was received.

Figure 13:
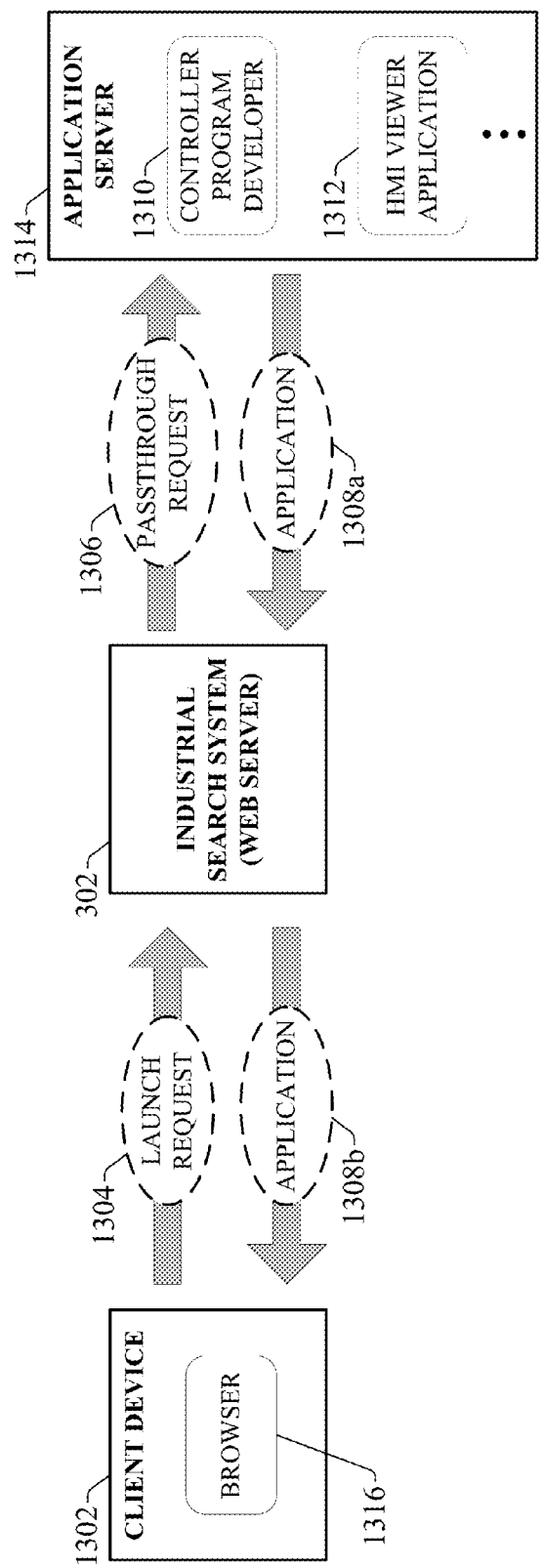
FIG. 13 is a block diagram illustrating an example architecture for remotely launching an industrial application.

FIG. 13 is a block diagram illustrating another architecture for remotely launching an industrial application. In this example, industrial search system 302 is implemented on a web server, and a separate application server 1314 hosts the industrial applications to be launched remotely (e.g., controller program developer 1310, HMI application 1312, drive software, camera or instrument software, etc.). When client device 1302 sends a launch request 1304 to the search system 302 (e.g., via browser application 1316), the web server running search system 302 sends a passthrough request 1306 to application server 1314 requesting the indicated application. In response to receiving the passthrough request 1306, application server 1314 sends the selected application 1308 to the client device 1302, which launches the application in browser application 1316. The application server 1314 may send the application 1308 directly to the client device 1302, or may send the application 1308 to search system 302, which passes the application through to client device 1302.

Although FIG. 13 depicts only a single application server, some implementations may comprise multiple servers hosting their own dedicated content. For example, a given facility may include multiple dedicated HMI devices that each host their own visualization content (e.g., display screens, animations, system data, etc.). When a user selects a search result corresponding to content on one of the HMI devices, the search system 302 will redirect the corresponding launch request to the appropriate HMI host.

Figure 14:
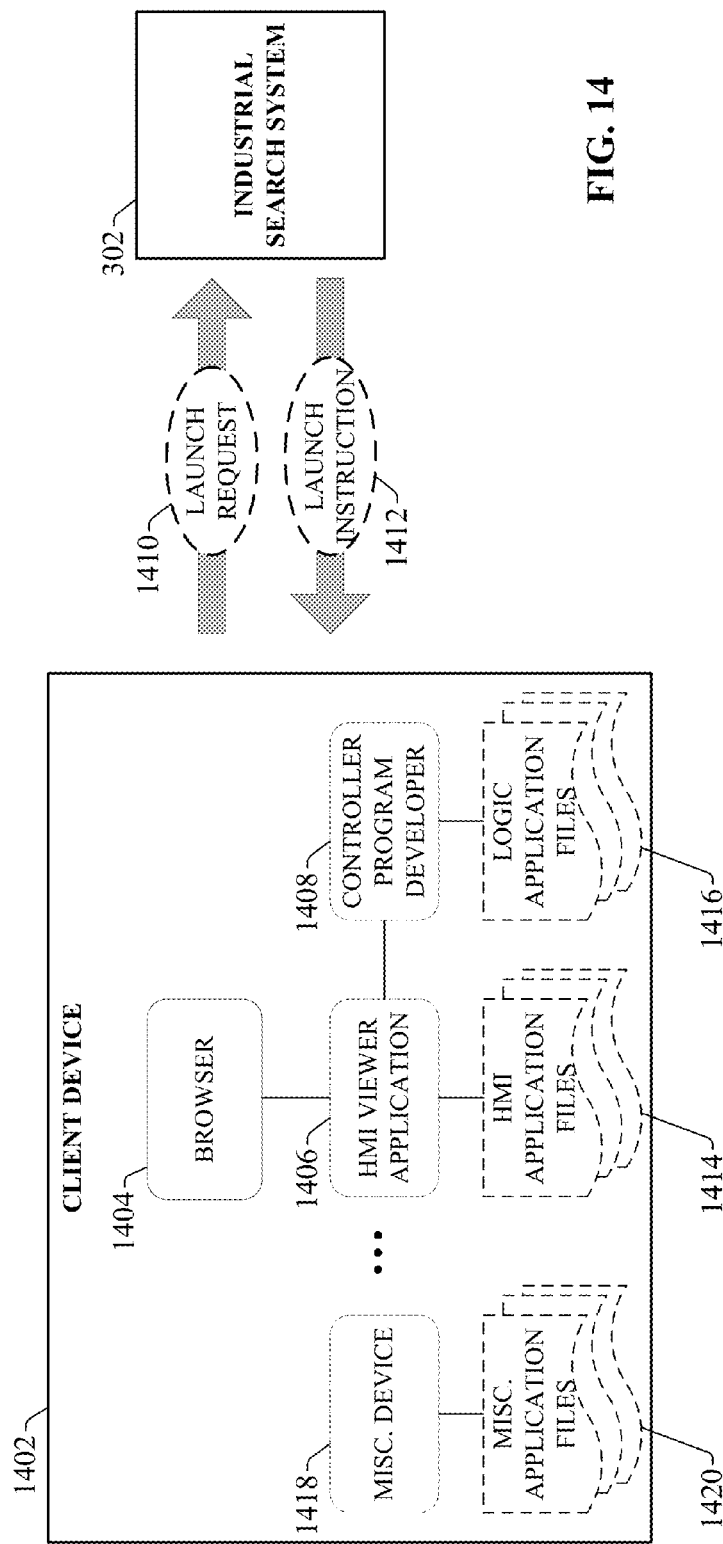
FIG. 14 is a block diagram illustrating another example architecture for remotely launching an industrial application.

FIG. 14 is a block diagram illustrating another implementation for remotely launching an industrial application. In this example, client device 1402 is pre-installed with HMI viewer application 1406 and controller program developer 1408. Client device 1402 also stores application files for the HMI viewer application 1406 and controller program developer 1408 (other miscellaneous types of applications 1418 and associated application files 1420 may also be stored on client device 1402, including but not limited to camera viewing and configuration software, motor drive configuration software, instrumentation software, etc.). HMI application files 1414 may comprise, for example, different HMI applications corresponding to different industrial systems, machines, work areas, etc. Each HMI application file 1414 contains the display screen definitions, graphical layout definitions, animation configurations, etc. for a particular HMI application. Each HMI application file can be loaded on HMI viewer application 1406 locally at the client device 1402 to facilitate viewing the defined displays screens. Logic application files 1416 correspond to controller programs that have been downloaded to respective industrial controllers throughout the plant. Each logic application file can be loaded on controller program developer 1408 to facilitate viewing and editing of the loaded controller program.

In this example, the industrial search system 302 is configured to remotely launch a selected application file within its appropriate viewing context. For example, after industrial search system 302 has delivered a set of search results to the browser application 1404 of client device 1402, the user may select a particular search result to be viewed (e.g., by selecting a "Launch Application" control associated with the result, as described above in connection with FIGS. 6-10), causing a launch request 1410 to be sent to search system 302. In response to receiving the launch request 1410, industrial search system 302 sends a launch instruction 1412 to the client device 1402 instructing the device which application (HMI viewer application 1406 or controller program developer 1408) to launch, as well as which application file should be loaded to facilitate viewing the selected search result. The launch instruction 1412 can also cause the selected application to navigate to the appropriate HMI screen or logic rung corresponding to the selected search result. Using this architecture, industrial applications are installed locally on each user's client device, and run remotely by the industrial search system 302.

Figure 15:
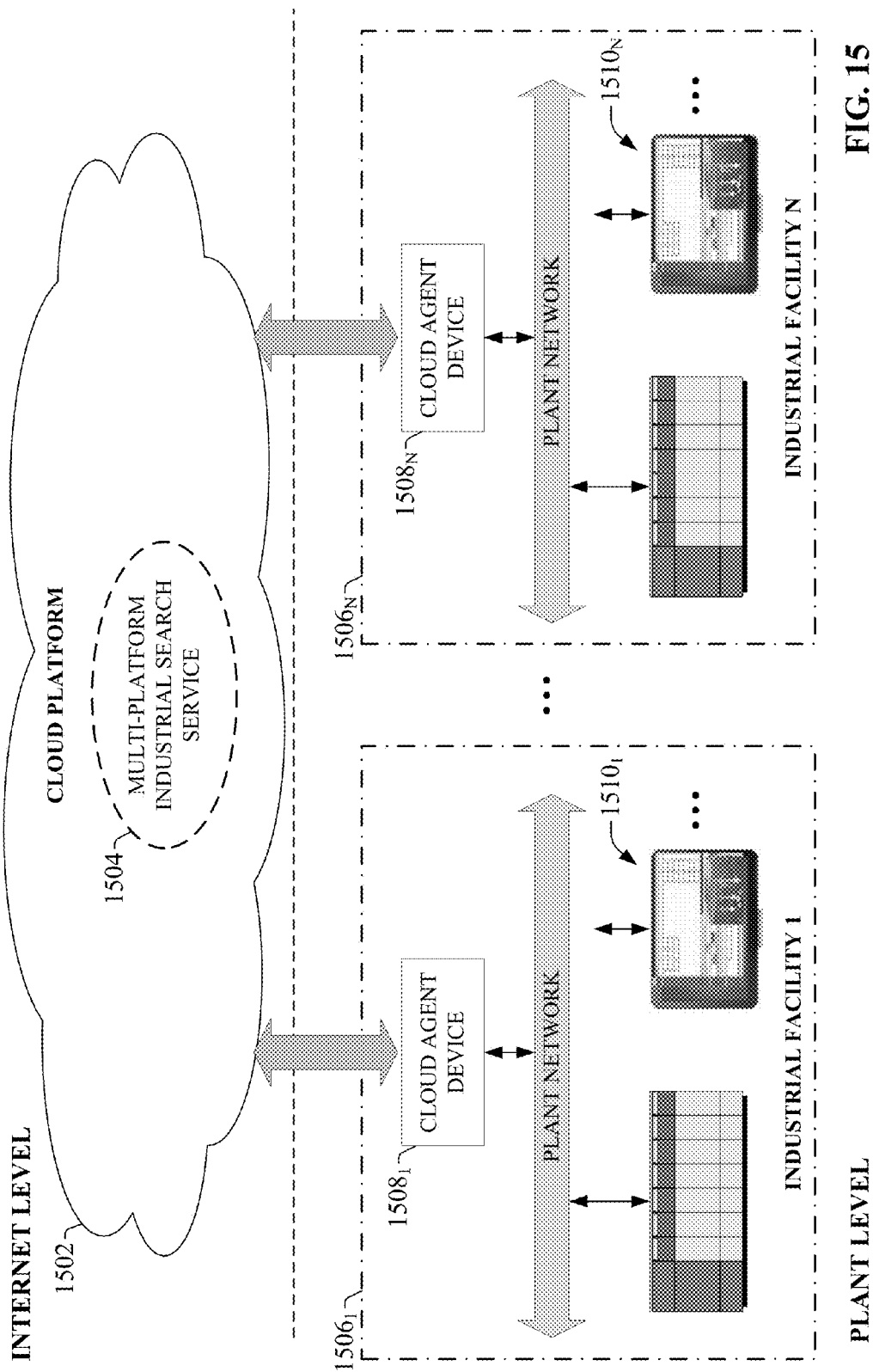
FIG. 15 is a conceptual diagram of a generalized cloud-based implementation for an industrial search system.

As noted above, one or more embodiments of the multi-platform industrial search system can be implemented on a cloud platform. FIG. 15 is a conceptual diagram of a generalized cloud-based implementation for the industrial search system described herein. In this implementation, the multi-platform industrial search system executes as a cloud-based service 1504 on cloud platform 1502, allowing industrial data from multiple geographically diverse industrial facilities (e.g., industrial facilities 1506$_1$-1506$_N$) to be indexed under a common federated data model for collective searching. This cloud-based implementation also allows a user to access the industrial search service 1504 from substantially any location.

According to one or more embodiments, on-premise cloud agent devices 1508 can collect data from industrial devices 1510—or from other data sources, including but not limited to data historians, business-level systems, etc.—and make this data available to the indexing component 304 of search service 1504, which incorporates the collected data into federated data model 202 on the cloud platform 1502. Cloud platform 1502 can be any infrastructure that allows industrial search service 1504 to be accessed and utilized by cloud-capable devices. Cloud platform 1502 can be a public cloud accessible via the Internet by devices having Internet connectivity and appropriate authorizations to utilize the industrial search service 1504. In some scenarios, cloud platform 1502 can be provided by a cloud provider as a platform-as-a-service (PaaS), and the industrial search service 1504 can reside and execute on the cloud platform 1502 as a cloud-based service. In some such configurations, access to the cloud platform 1502 and the industrial search service 1504 can be provided to customers as a subscription service by an owner of the industrial search service 1504. Alternatively, cloud platform 1502 can be a private or semi-private cloud operated internally by the enterprise, or a shared or corporate cloud environment. An example private cloud can comprise a set of servers hosting the industrial search service 1504 and residing on a corporate network protected by a firewall.

If cloud platform 1502 is a web-based cloud, cloud agent devices 1508 at the respective industrial facilities 1506 may interact with industrial search service 1504 directly or via the Internet. In an example configuration, the industrial devices 1510 connect to the on-premise cloud agent devices 1508 through a physical or wireless local area network or radio link. In another example configuration, the industrial devices 1510 may access the cloud platform 1502 directly using integrated cloud agents.

Figure 16:
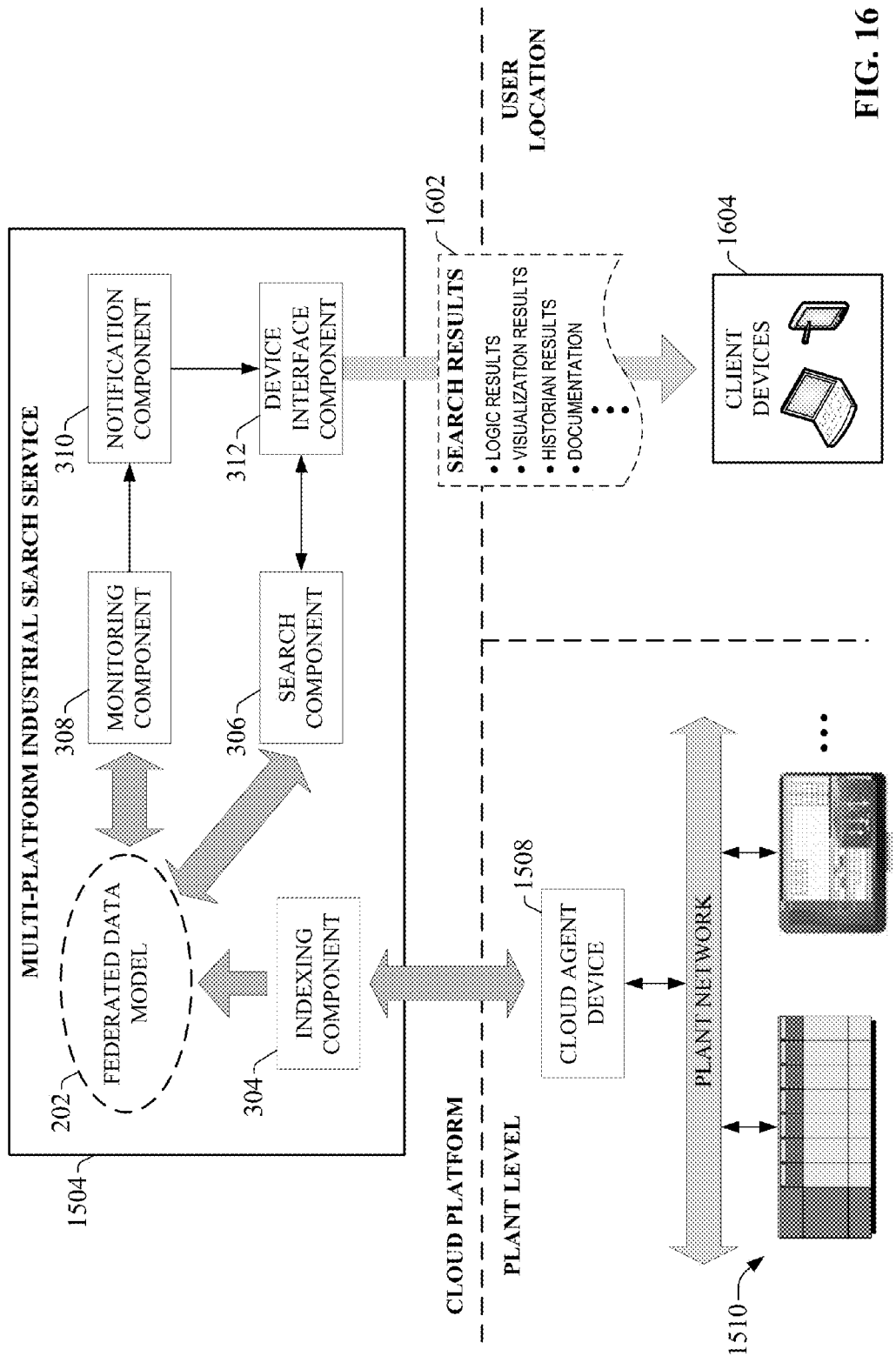
FIG. 16 is a block diagram illustrating a cloud-based industrial search service.

FIG. 16 is a block diagram illustrating a cloud-based industrial search service in more detail. As described in previous examples, indexing component 304 generates federated data model 202, which indexes and correlates multi-platform industrial data and documentation from on-premise industrial devices 1510. In this cloud-based implementation, the indexing component 304 may interface with the industrial devices 1510 via cloud agent device 1508. In some embodiments, cloud agent device 1508 may monitor industrial devices 1510 and their associated data items, index discovered data items throughout the industrial facility, and present this indexed information to indexing component 304, which incorporates the indexed information in federated data model 202. In other embodiments, cloud agent device 1508 may serve as a gateway between indexing component 304 and industrial devices 1510 on the plant floor, allowing indexing component to discover, correlate, and index the multi-platform data items in a similar manner to that described above in connection with FIG. 5.

Monitoring component 308, notification component 310, and search component 306 perform similar functions to those described above in connection with FIG. 5. In this cloud-based implementation, device interface component 312 exchanges data with authorized client devices 1604 via the cloud platform. This can include receiving requests from the client devices 1604 for access to the industrial search service 1504 and verifying that the client devices 1604 are authorized to access and use the service (e.g., using password verification, biometric verification, etc.). Authorized client devices 1604, which can be located either within or outside the plant facility, can submit search queries to and receive search results 1602 from the cloud-based industrial search service 1504 as described in previous examples. Moreover, the monitoring component 308 can monitor one or more data items on industrial devices 1510 in accordance with defined monitoring rules (similar to monitoring rules 506 of FIG. 5), initiate defined automated searches in response to determinations that the monitored data satisfies criteria defined by the monitoring rules, and instruct notification component 310 to deliver suitable notifications to specified plant personnel, as described in previous examples. Since the notification service is implemented in a cloud platform, the system can deliver these notifications to client devices at any location with access to the Internet (e.g., wired, wireless, cellular, etc.).

Figure 17:
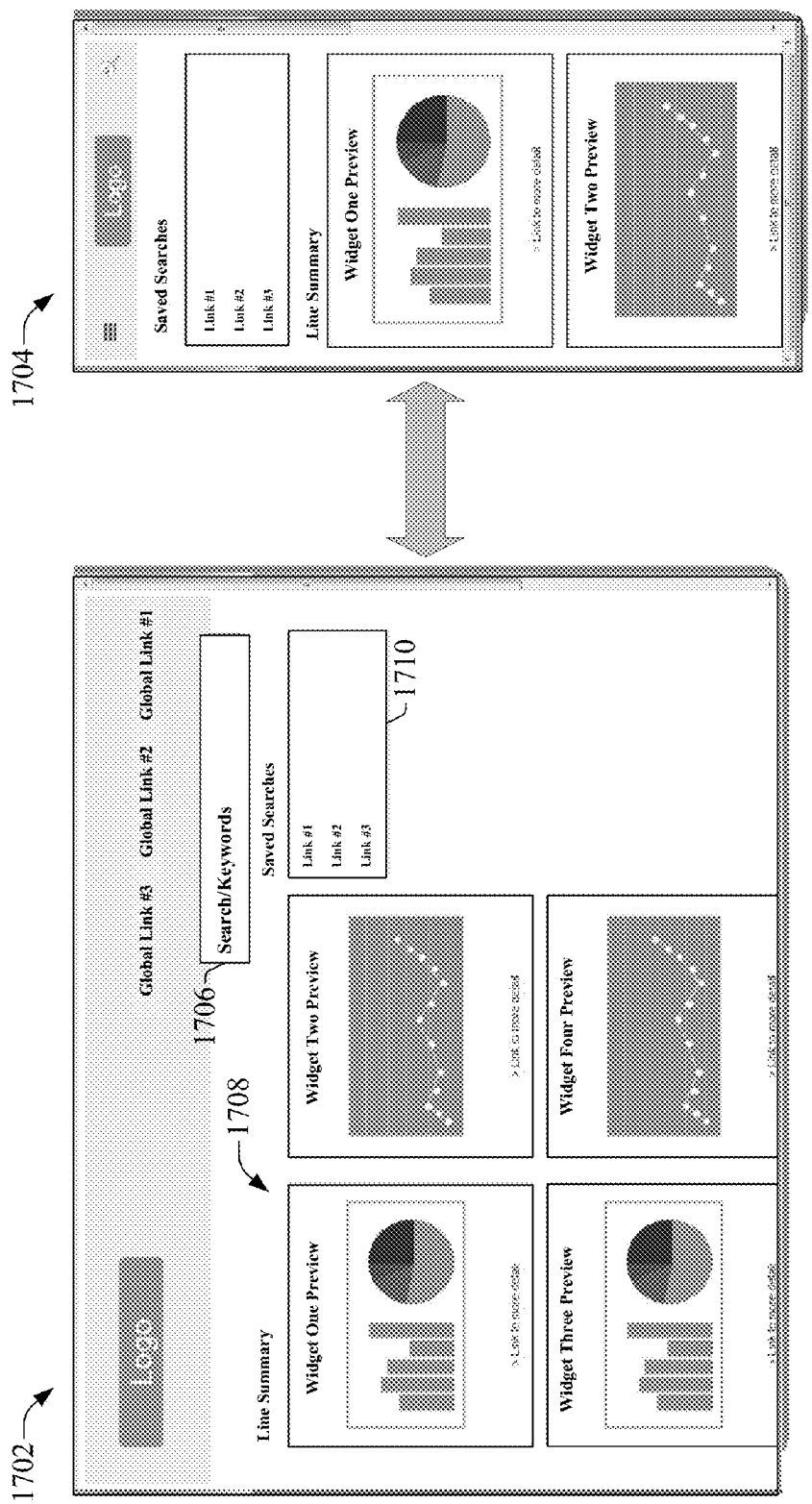
FIG. 17 is an example home interface screen that can be served to a client device by industrial search system.

In some embodiments, the industrial search system allows users to customize the home screen delivered to their client device by device interface component 312. FIG. 17 is an example home interface screen 1702 that can be served to a client device by industrial search system 302. Home interface screen 1702 includes a search window 1706 for entering and submitting manual searches to the industrial search system. The system allows the user to save previously submitted searches in a "Saved Searches" list 1710, allowing the user to re-submit searches without the need to manually re-enter the search keywords in search window 1706. The user may also configure their home interface screen 1702 to display information summaries 1708 of selected aspects of their industrial systems. These summaries can be configured as alphanumeric data displays, graphical status indicators, bar graphs, pie charts, line graphs, or other suitable presentation format. In some embodiments, the home interface screen 1702 can also contain selected HMI screens or controller logic screens with active data animation. Since the industrial search system serves interface displays to disparate types of client devices having different sizes and display aspect ratios, the system can automatically scale and arrange screen content to fit the display parameters of the client device on which the screen is being displayed. For example, home interface screen 1702 may be suitable for display on a laptop or tablet computer. If the user invokes home interface screen on a mobile phone, the search system may deliver a reformatted display screen 1704, which conforms to the size and aspect ratio of that device.

Figure 18:
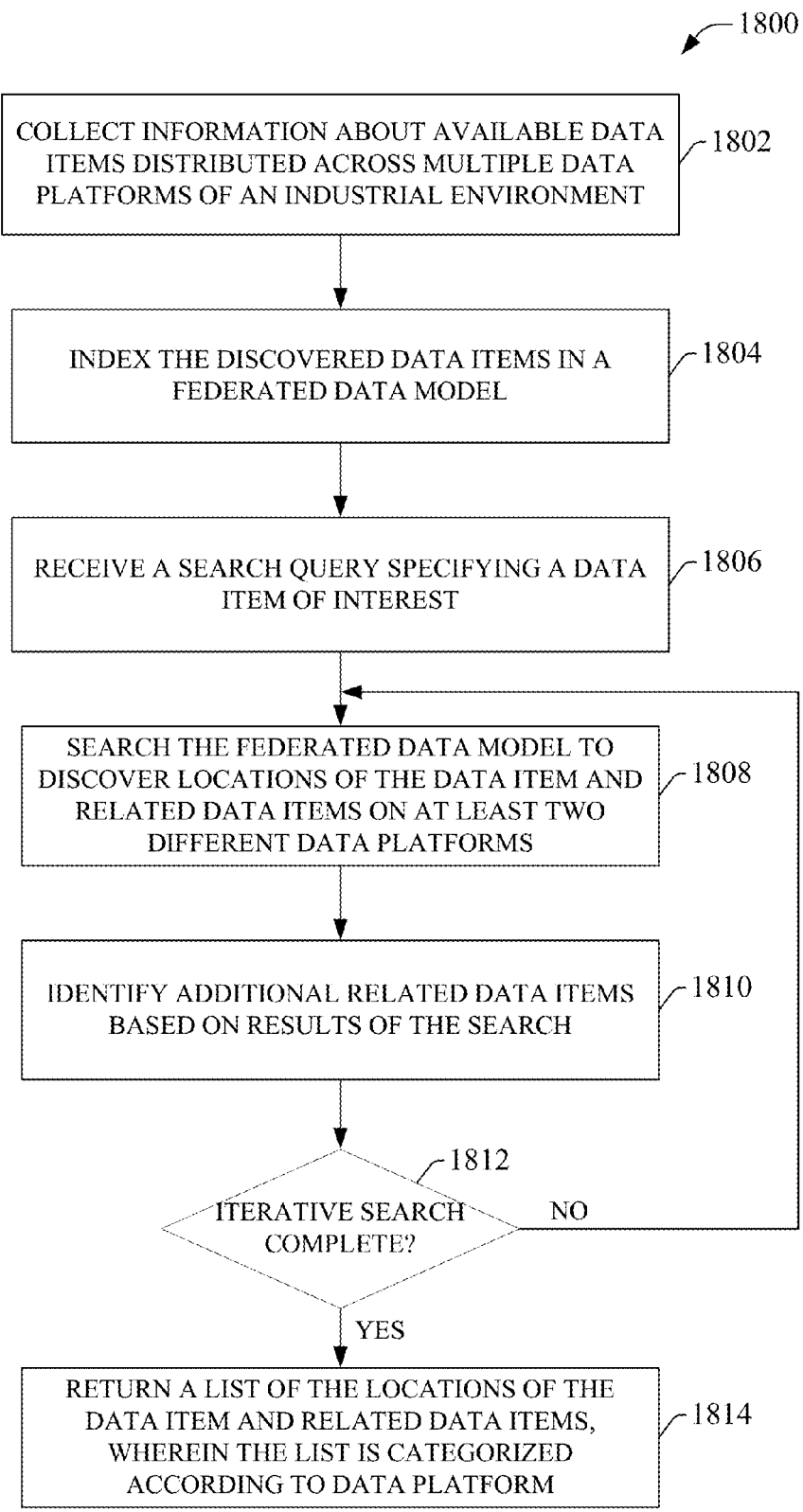
FIG. 18 is a flowchart of an example methodology for indexing and searching multi-platform industrial data.
Figure 19:
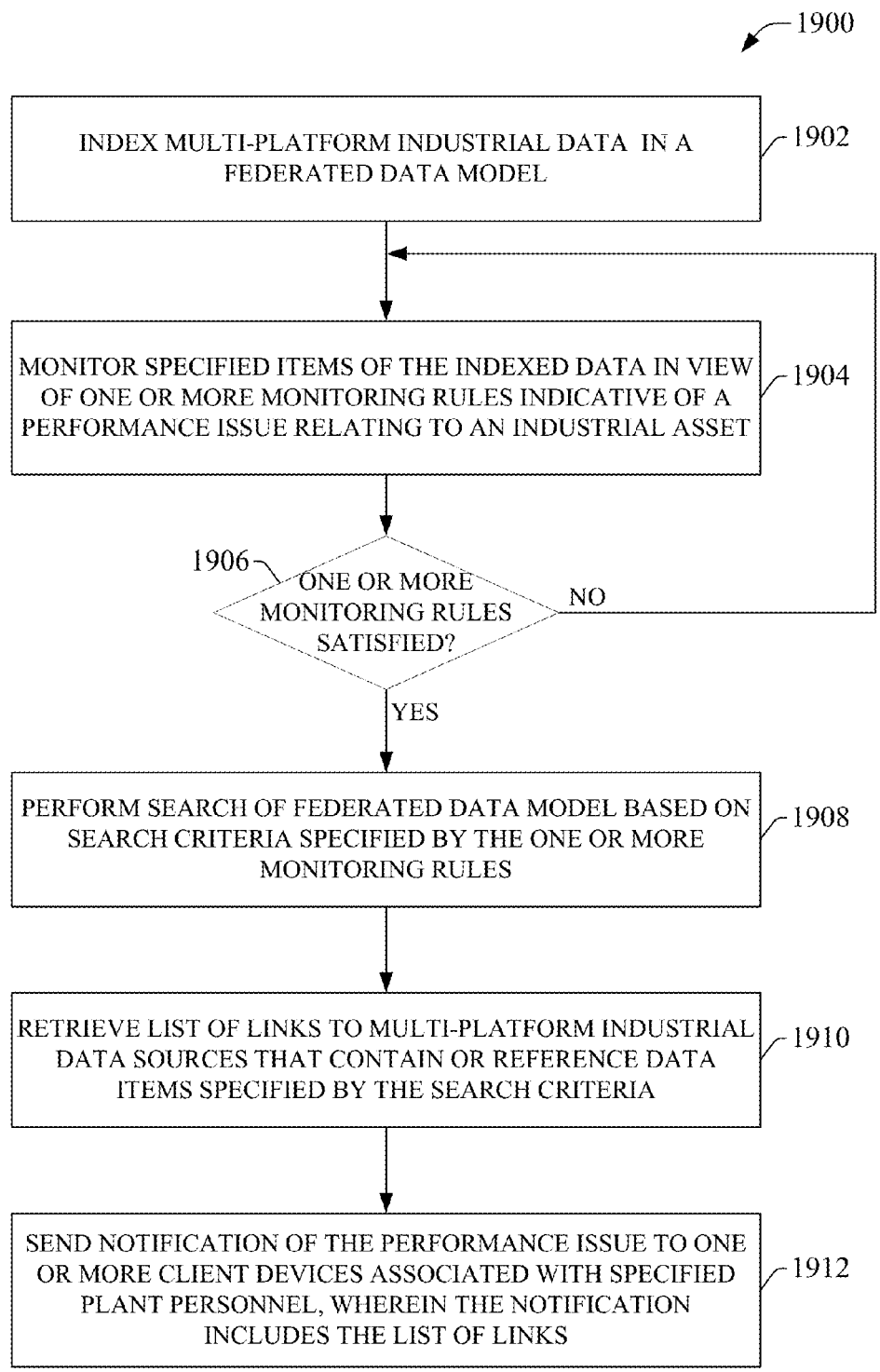
FIG. 19 is a flowchart of an example methodology for dynamically monitoring industrial assets and notifying plant personnel of performance issues.
Figure 20:
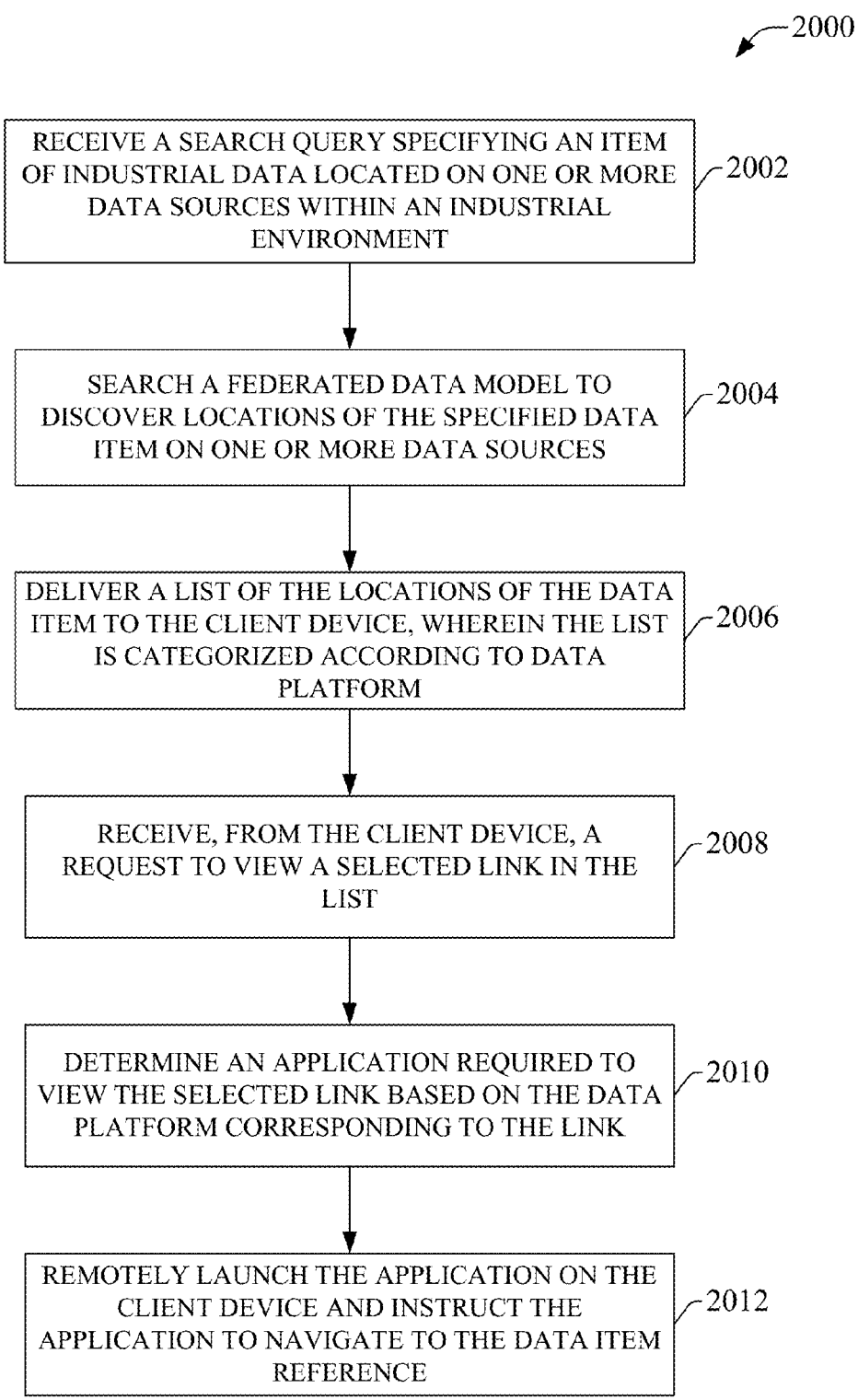
FIG. 20 is a flowchart of an example methodology for remotely launching industrial applications on a client device to facilitate viewing of multi-platform search results.

FIGS. 18-20 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 18 illustrates an example methodology 1800 for indexing and searching multi-platform industrial data. Initially, at 1802, information about available data items distributed across multiple data platforms of an industrial environment is collected. This information can be collected, for example, by an indexing component of an industrial search system implemented on a stand-alone server, a web server, a cloud platform, or other implementation. In some embodiments, the information can be collected using a crawler that navigates a plant network and collects information regarding devices and systems in use (e.g., industrial controllers, HMIs, motor drives, documentation repositories, inventory tracking systems, etc.), and the available data associated with each device or system. The indexing component can also identify correlations between data items across the various devices and data platforms (e.g., identifying that a data tag referenced on a particular rung of a control logic program is also referenced on a display screen of an HMI).

At 1804, the data items (and the relationships between the data items) discovered at step 1802 are indexed in a federated data model. At 1806, a search query specifying a data item of interest is received. The search query can specify, for example, a particular data tag, a device name, a machine name, or other such search criterion. At 1808, the federated data model is searched to discover locations of the specified data item (and related data items) on at least two different data platforms within the plant environment. For example, based on a search of the federated data model, it may be discovered that the specified data item is referenced on one or more rungs of a controller logic program executing on an industrial controller (a first platform), as well as on one or more display screens of an HMI (a second platform).

At 1810, additional related data items are identified based on results of the search performed at step 1808. For example, the search system may determine, based on examination of the search results, one or more data tags that affect the data item of interest (e.g., statuses of other devices, measured process variables involving other devices, etc.). The search system can perform additional searches on these newly discovered related data items in an iterative fashion until a defined completion criterion is met. Accordingly, at 1812, a determination is made regarding whether the iterative search is complete (e.g., based on satisfaction of the completion criterion). If the iterative search is not complete, the methodology returns to step 1810 and another search of the federated data model is performed using the specified data item and the additional related data items as search criteria. In this way, the search system iteratively cycles through the indexed information recorded in the federated data model until all relationships determined to be relevant to specified data item are found.

If it is determined at step 1812 that the iterative search is complete, a list of the locations discovered at 1808 is returned at step 1814, wherein the list is categorized according to data platform. For example, the list may include a first list of search results corresponding to controller logic rungs on which the data item (and related data items) is referenced, and a second list corresponding to HMI screens on which the data item is referenced.

FIG. 19 illustrates an example methodology 1900 for dynamically monitoring industrial assets and notifying plant personnel of performance issues. Initially, at 1902, multi-platform industrial data is indexed in a federated data model. The multi-platform data can be discovered automatically by an indexing component of an industrial search system, as described in previous examples. The indexing component can index data items discovered in disparate data sources (e.g., industrial controllers, HMIs, inventory tracking systems, device documentation repositories, etc.) as well as discovered relationships between the data items.

At 1904, specified items of the indexed data are monitored in view of one or more monitoring rules. The monitoring rules can be indicative of performance issues relating to various industrial assets, such that a possible performance issue is discovered when one or more data item values satisfy a criterion defined by the monitoring rules. At 1906, a determination is made regarding whether one or more of the monitoring rules are satisfied based on the monitoring performed at step 1904. If no monitoring rules are satisfied, the methodology returns to step 1904 and the monitoring continues.

Alternatively, if it is determined at step 1906 that one or more of the monitoring rules are satisfied, the methodology moves to step 1908, where a search of the federated data model is performed based on search criteria specified by the one or more satisfied monitoring rules. In this regard, each monitoring rule may define one or more search criteria to be submitted to the federated data model when that particular monitoring rule is satisfied. The search criteria can be designed to gather relevant information about the particular performance issue being monitored by the rule. In some embodiments, the search system can perform an iterative search of the data model to obtain additional relevant information, as described above in connection methodology 1800 (see FIG. 18).

At 1910, a list of links to multi-platform industrial data sources that contain or reference data items specified by the search criteria are retrieved. The list may include links to controller logic rungs that reference data items specified in the search criteria, HMI screens that reference the data items, documentation for devices comprising the identified industrial assets experiencing the performance issue, or other such data sources. At 1912, a notification of the performance issue is sent to one or more client devices associated with specified plant personnel. The notification can include both an alert notifying of the performance issue, as well as the list of links retrieved at step 1910, which provide relevant context for the performance issue and allow the notified personnel to begin remotely diagnosing the issue.

FIG. 20 illustrates an example methodology 1900 for remotely launching industrial applications on a client device to facilitate viewing of multi-platform search results. Initially, at 2002, a search query specifying an item of industrial data is received. The data item may be located on one or more diverse data sources within an industrial environment. The search query may be received from a client device, or may be generated automatically in response to detection of a defined search trigger (e.g., a trigger indicative of a performance issue relating to an industrial automation system). At 2004, a federated data model is searched to discover locations of the specified data item on one or more data sources (e.g., industrial controllers, HMIs, etc.) throughout the industrial environment. At 2006, a list of locations of the data item is delivered to a client device. The list can comprise links that are categorized according to data platform (e.g., controller logic references, HMI screen references, etc.).

At 2008, a request to view a selected link in the list is received from the client device. At 2010, an application required to view the selected link is determined based on the data platform corresponding to the selected link. For example, if the user at the client device selects a controller logic reference, it is determined that a control logic development application is required to view the link. Similarly, selection of an HMI reference causes an HMI viewing application to be selected. In some embodiments, the request to view the selected link may include a user selection indicating how the selected result should be displayed (e.g., which application should be launched, display preferences, etc.).

At 2012, the application selected at step 2010 is remotely launched on the client device (or on a different client or server device), and the application is instructed to navigate to the reference to the data item. For example, for a controller logic reference, the controller logic development application can be remotely launched on the client device, the application file corresponding to the controller logic on which the data item is referenced can be loaded within the application, and the application is instructed to navigate to the particular rung on which the data item is referenced. Similarly, for an HMI screen reference, the HMI viewer can be launched on the client device and loaded with the appropriate HMI application, which is then instructed to navigate to the display screen containing the reference to the data item. In some embodiments, web versions of the applications can be launched in a browser application of the client device. Also, in various embodiments, the remote launching of the application may comprise instructing an instance of the application pre-installed on the client device to launch, or launching a remote instance of an application stored on the search system. In some embodiments, the application may be instructed to launch on a different device other than the client device (e.g., on a server, on a different client device, etc.).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 21:
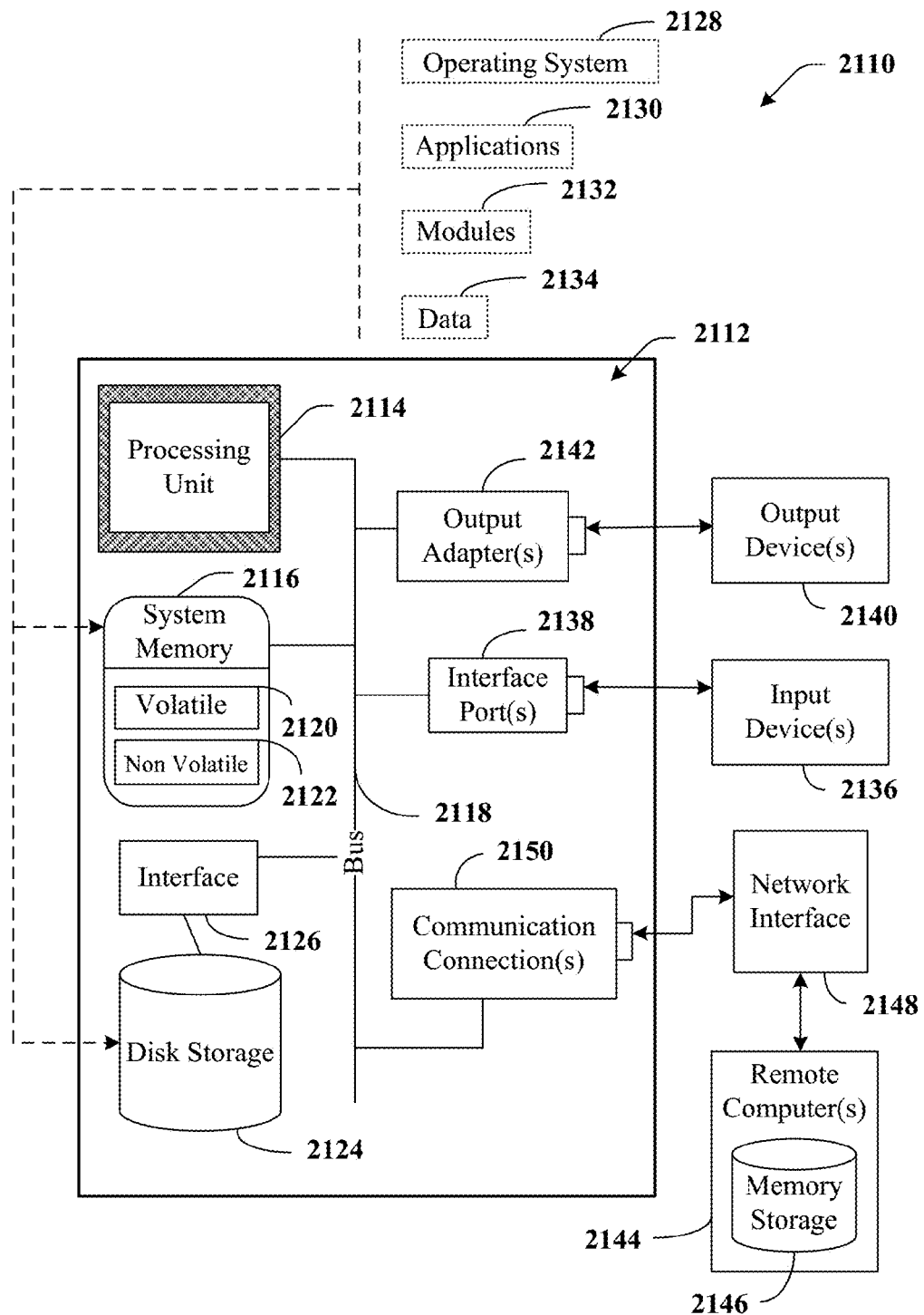
FIG. 21 is an example computing environment.
Figure 22:
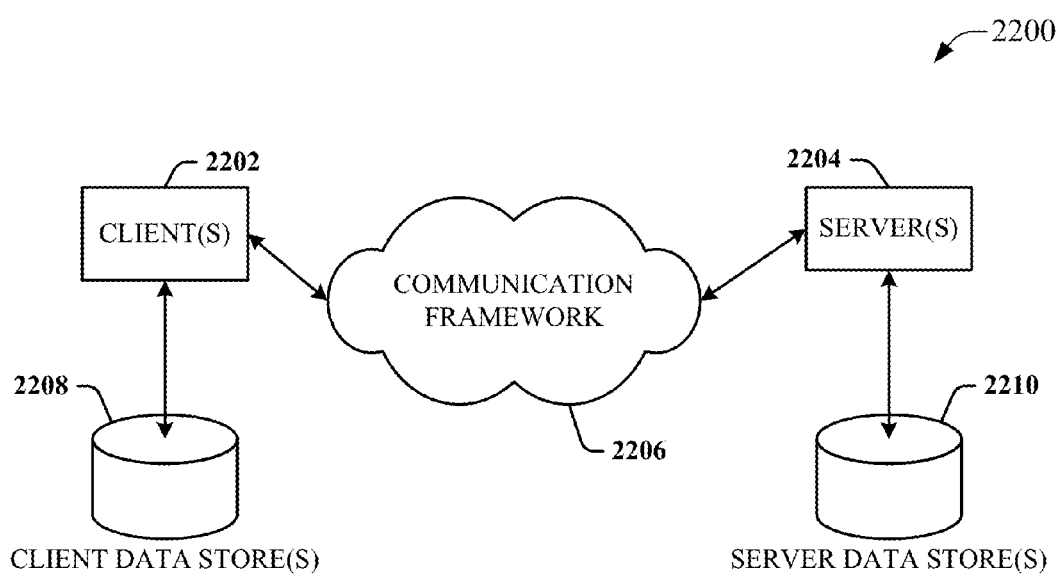
FIG. 22 is an example networking environment.

In order to provide a context for the various aspects of the disclosed subject matter, FIGS. 21 and 22 as well as the following discussion are intended to provide a brief, general description of a suitable environment in which the various aspects of the disclosed subject matter may be implemented.

With reference to FIG. 21, an example environment 2110 for implementing various aspects of the aforementioned subject matter includes a computer 2112. The computer 2112 includes a processing unit 2114, a system memory 2116, and a system bus 2118. The system bus 2118 couples system components including, but not limited to, the system memory 2116 to the processing unit 2114. The processing unit 2114 can be any of various available processors. Multi-core microprocessors and other multiprocessor architectures also can be employed as the processing unit 2114.

The system bus 2118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2116 includes volatile memory 2120 and nonvolatile memory 2122. The basic input/output system (BIOS), containing the basic routines to transfer information between elements within the computer 2112, such as during start-up, is stored in nonvolatile memory 2122. By way of illustration, and not limitation, nonvolatile memory 2122 can include read only memory (ROM), programmable ROM (PROM), electrically programmable ROM (EPROM), electrically erasable PROM (EEPROM), or flash memory. Volatile memory 2120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2112 also includes removable/non-removable, volatile/non-volatile computer storage media. FIG. 21 illustrates, for example a disk storage 2124. Disk storage 2124 includes, but is not limited to, devices like a magnetic disk drive, floppy disk drive, tape drive, Jaz drive, Zip drive, LS-100 drive, flash memory card, or memory stick. In addition, disk storage 2124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2124 to the system bus 2118, a removable or non-removable interface is typically used such as interface 2126.

It is to be appreciated that FIG. 21 describes software that acts as an intermediary between users and the basic computer resources described in suitable operating environment 2110. Such software includes an operating system 2128. Operating system 2128, which can be stored on disk storage 2124, acts to control and allocate resources of the computer 2112. System applications 2130 take advantage of the management of resources by operating system 2128 through program modules 2132 and program data 2234 stored either in system memory 2116 or on disk storage 2124. It is to be appreciated that one or more embodiments of the subject disclosure can be implemented with various operating systems or combinations of operating systems.

A user enters commands or information into the computer 2112 through input device(s) 2136. Input devices 2136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2114 through the system bus 2118 via interface port(s) 2138. Interface port(s) 2138 include, for example, a serial port, a parallel port, a game port, and a universal serial bus (USB). Output device(s) 2140 use some of the same type of ports as input device(s) 2136. Thus, for example, a USB port may be used to provide input to computer 2112, and to output information from computer 2112 to an output device 2140. Output adapters 2142 are provided to illustrate that there are some output devices 2140 like monitors, speakers, and printers, among other output devices 2140, which require special adapters. The output adapters 2142 include, by way of illustration and not limitation, video and sound cards that provide a means of connection between the output device 2140 and the system bus 2118. It should be noted that other devices and/or systems of devices provide both input and output capabilities such as remote computer(s) 2144.

Computer 2112 can operate in a networked environment using logical connections to one or more remote computers, such as remote computer(s) 2144. The remote computer(s) 2144 can be a personal computer, a server, a router, a network PC, a workstation, a microprocessor based appliance, a peer device or other common network node and the like, and typically includes many or all of the elements described relative to computer 2112. For purposes of brevity, only a memory storage device 2246 is illustrated with remote computer(s) 2144. Remote computer(s) 2144 is logically connected to computer 2112 through a network interface 2148 and then physically connected via communication connection 2150. Network interface 2148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 2148 can also encompass near field communication (NFC) or Bluetooth communication.

Communication connection(s) 2150 refers to the hardware/software employed to connect the network interface 2148 to the system bus 2118. While communication connection 2150 is shown for illustrative clarity inside computer 2112, it can also be external to computer 2112. The hardware/software necessary for connection to the network interface 2148 includes, for exemplary purposes only, internal and external technologies such as, modems including regular telephone grade modems, cable modems and DSL modems, ISDN adapters, and Ethernet cards.

FIG. 22 is a schematic block diagram of a sample computing environment 2200 with which the disclosed subject matter can interact. The sample computing environment 2200 includes one or more client(s) 2202. The client(s) 2202 can be hardware and/or software (e.g., threads, processes, computing devices). The sample computing environment 2200 also includes one or more server(s) 2204. The server(s) 2204 can also be hardware and/or software (e.g., threads, processes, computing devices). The servers 2204 can house threads to perform transformations by employing one or more embodiments as described herein, for example. One possible communication between a client 2202 and servers 2204 can be in the form of a data packet adapted to be transmitted between two or more computer processes. The sample computing environment 2200 includes a communication framework 2206 that can be employed to facilitate communications between the client(s) 2202 and the server(s)

2204. The client(s) 2202 are operably connected to one or more client data store(s) 2208 that can be employed to store information local to the client(s) 2202. Similarly, the server(s) 2204 are operably connected to one or more server data store(s) 2210 that can be employed to store information local to the servers 2204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for searching industrial data, comprising:
a memory that stores executable components;
a processor, operatively coupled to the memory, that executes the components, the components comprising:
an indexing component configured to discover available data items distributed across multiple data sources of an industrial environment and to generate a federated data model that records respective locations of the data items, wherein the data items comprise at least first data tags of one or more control programs stored on one or more industrial controllers and visualization references of second data tags displayed on one or more human-machine interface devices;
a search component configured to perform a search of the federated data model for a specified data item and to generate a set of search results identifying locations of the data item, wherein the set of search results comprises at least a first subset of results representing a subset of the first data tags corresponding to the data item and stored on at least one of the one or more industrial controllers and a second subset of results representing one or more of the visualization references of a subset of the second data tags corresponding to the data item; and
a device interface component configured to segregate the set of search results into the first subset of results and the second subset of results to yield a segregated set of search results and send the segregated set of search results to a client device.

2. The system of claim 1, wherein the one or more control programs comprise at least one of one or more ladder logic programs, one or more sequential function chart programs, one or more function block diagrams, or one or more structured text programs.

3. The system of claim 1, wherein the multiple data sources further comprise at least one of a data historian device, a work order management system, an inventory tracking system, or a documentation data store.

4. The system of claim 1, wherein the device interface component is further configured to:
in response to receipt of first selection data from the client device indicating a selection of a first search result of the first subset of results, select a controller logic development application from among a set of available applications, initiate a launching of the controller logic development application on at least one of the client device or another client device, and instruct the controller logic development application to display the first search result on the client device or the other client device, and
in response to receipt of second selection data from the client device indicating a selection of a second search result of the second subset of results, select a human-machine interface viewing application from among the set of available applications, initiate a launching of the human-machine interface viewing application on at least one of the client device or the other client device, and instruct the human-machine interface viewing application to display the second search result on the client device or the other client device.

5. The system of claim 4, wherein the device interface component is further configured to establish a communicative link between the client device and a data source corresponding to the first search result or the second search result, and deliver near real-time values of a data item corresponding to the first search result or the second search result retrieved from the data source to the client device.

6. The system of claim 1, further comprising:
a monitoring component configured to, in response a determination that one or more near real-time values of the available data items satisfy a criterion defined in a monitoring rule indicative of a performance issue relating to an industrial asset, initiate an automated search of the federated data model based on a search criterion defined in the monitoring rule; and a notification component configured to, in response to the determination that the one or more near real-time values satisfy the criterion, send notification information to one or more client devices, wherein the notification information comprises information about the performance issue and a set of results of the automated search.

7. The system of claim 1, wherein the indexing component, the search component, and the device interface component are implemented on at least one of a stand-alone computing device, a web server device, or one or more cloud platform devices.

8. The system of claim 1, wherein the device interface component is further configured to receive search query data specifying the data item, wherein the search query data comprises at least one of manually entered text data, translated barcode data, translated quick response (QR) code data, or information retrieved from an industrial device via near field communication.

9. The system of claim 1, wherein at least one result of the second subset of results identifies a human-machine interface application and an interface screen of the human-machine interface application on which the data item is displayed.

10. A method for indexing and searching multi-platform industrial data, comprising:
  identifying, by a system comprising a processor, available data items located on multiple data sources of an industrial environment, wherein the available data items comprise at least first data tags referenced by one or more control programs stored on one or more industrial controllers and visualization references of second data tags displayed on one or more human-machine interface devices;
  generating, by the system, a federated data model that indexes respective locations of the data items;
  receiving, by the system, query information specifying a data item;
  in response to the receiving, identifying, by the system, locations of the data item based on a search of the federated data model;
  generating, by the system, a set of search results identifying the locations of the data item, wherein the set of search results are segregated into at least a first subset of results representing a subset of the first data tags matching the data item stored on at least one of the one or more industrial controllers and a second subset of results representing one or more of the visualization references of the second data tags matching the data item; and
  sending, by the system, the set of search results to a client device.

11. The method of claim 10, wherein the search is a first search and the set of search results is a first set of search results, and the method further comprises:
  identifying one or more related data items that are related to the data item based on the first set of search results; and
  determining a second set of search results based on at least a second search of the federated data model, wherein the second search uses the data item and the one or more related data items as search criteria,
  wherein the sending comprises sending the second set of search results to the client device.

12. The method of claim 10, further comprising
in response to the receiving the query information,
  performing a web search using one or more results of the set of search results as search criteria,
  receiving at least one web search result based on the web search;
  correlating the at least one web search result to the one or more results, and
  displaying at least one link to the at least one web search result in association with the one or more results.

13. The method of claim 10, further comprising, in response to receiving selection data from the client device indicating a selection of a search result of the first subset of results,
  selecting a controller logic development application from a set of available applications corresponding to respective different types of the multiple data sources,
  initiating a launching of the controller logic development application on at least one of the client device or another client device, and
  instructing the controller logic development application to display the search result on the client device or the other client device.

14. The method of claim 13, further comprising:
  creating a communicative link between a data source corresponding to the search result and at least one of the client device or the other client device;
  retrieving values of the data item from the data source; and
  sending the values to at least one of the client device or the other client device via the controller logic development application.

15. The method of claim 10, further comprising:
  recording one or more interactions with the set of search results via the client device;
  in response to receiving, from the client device or another client device, subsequent query information specifying the data item, performing another search of the federated data model using the data item and the one or more interactions as search criteria;
  generating another set of search results based on the other search; and
  sending the other set of search results to the client device or the other client device.

16. The method of claim 10, further comprising:
  determining, based on a monitoring of one or more values of the available data items, that the one or more values satisfy a criterion defined by a monitoring rule indicative of an operational issue with one or more industrial assets within the industrial environment; and
  in response to the determining:
    initiating an automated search of the federate data model based on a search criterion defined by the monitoring rule; and
    sending notification information to one or more client devices, wherein the notification information comprises an identification of the operational issue and one or more search results generated based on the automated search.

17. The method of claim 10, further comprising, in response to receiving selection data from the client device indicating a selection of a search result of the second subset of results,
  selecting a human-machine interface viewing application from a set of available applications corresponding to respective different types of the multiple data sources, initiating a launching of the human-machine interface viewing application on at least one of the client device or another client device, and instructing the human-machine interface viewing application to display the search result on the client device or the other client device.

18. A non-transitory computer-readable medium having stored thereon instructions that, in response to execution, cause a system comprising a processor to perform operations, the operations comprising:

discovering available data items located on multiple data sources of an industrial environment, wherein the available data items comprise at least first data tags of one or more control programs stored on one or more industrial controllers and visualization references of second data tags displayed on one or more human-machine interface devices;

creating a federated data model that records respective locations of the data items;

in response to receiving query information specifying a data item, identifying locations of the data item based on a search of the federated data model;

generating a set of search results corresponding to the locations of the data item, wherein the set of search results are categorized according to at least a first subset of results representing a subset of the first data tags corresponding to the data item and stored on at least one of the one or more industrial controllers and a second subset of results representing one or more of the visualization references corresponding to a subset of the second data tags corresponding to the data item; and sending the set of search results to a client device.

19. The non-transitory computer-readable medium of claim 18, wherein the operations further comprise:

identifying one or more related data items that are related to the data item based on the set of search results; and determining another set of search results based on at least another search of the federated data model that uses the data item and the one or more related data items as search criteria, wherein the sending comprises sending the other set of search results to the client device.

20. The non-transitory computer-readable medium of claim 18, wherein the operations further comprise:

in response to receiving selection of a search result from the first subset of results, initiating a controller logic development application and rendering the data item on the controller logic development application; and in response to receiving selection of a search result from the second subset of results, initiating a human-machine interface application and rendering the data item on a display screen of the human-machine interface application.

* * * * *